US012703287B1

(12) United States Patent
Meyer et al.

(10) Patent No.: US 12,703,287 B1
(45) Date of Patent: *Aug. 11, 2026

(54) MATERIAL COLLECTION AND TRANSFER CART

(71) Applicant: Amity Technology, LLC, Fargo, ND (US)

(72) Inventors: Bradley Meyer, Mapleton, ND (US); Michael Anderson, West Fargo, ND (US); Jake Gust, Fargo, ND (US); Lloyd Fehr, Fargo, ND (US); Damon Knobloch, Fargo, ND (US); Dennis Wulf, Fargo, ND (US); Jim Nieland, Fargo, ND (US); Brad Fehr, Fargo, ND (US)

(73) Assignee: Amity Technology, LLC, Fargo, ND (US)

( * ) Notice: Subject to any disclaimer, the term of this patent is extended or adjusted under 35 U.S.C. 154(b) by 435 days.

This patent is subject to a terminal disclaimer.

(21) Appl. No.: 18/337,141

(22) Filed: Jun. 19, 2023

Related U.S. Application Data

(63) Continuation of application No. 17/959,413, filed on Oct. 4, 2022, now Pat. No. 11,724,632, which is a (Continued)

(51) Int. Cl.
*B60P 1/28* (2006.01)
*B60P 1/16* (2006.01)
(Continued)

(52) U.S. Cl.
CPC ............... *B60P 1/162* (2013.01); *B60P 1/286* (2013.01); *B66F 9/0655* (2013.01); *B66F 9/22* (2013.01); *B62D 55/08* (2013.01); *B62D 63/06* (2013.01)

(58) Field of Classification Search
CPC ........... B60P 1/162; B60P 1/286; B60P 1/167; B60P 1/16; B60P 1/04; B66F 9/0655; B66F 9/22; B21B 39/222
(Continued)

(56) References Cited

U.S. PATENT DOCUMENTS

| | | | | | |
|---|---|---|---|---|---|
| 3,019,054 | A * | 1/1962 | Stahly | B60P 1/165 298/5 |
| 5,826,947 | A * | 10/1998 | Hornung | B60P 1/34 298/7 |

(Continued)

OTHER PUBLICATIONS

Afri-Link Logistics, 34ton side tipper link; youtube.com; youtube.com/watch?v=rSXhXfvHMk8; William Spires; accessed Jan. 8, 2026; published Jul. 8, 2014 (Year: 2014).*

*Primary Examiner* — Amy R Weisberg
*Assistant Examiner* — Philip C Adams
(74) *Attorney, Agent, or Firm* — Mai D. Lauer; Westman, Champlin & Koehler, P.A.

(57) ABSTRACT

An apparatus includes a base frame, first and second bins, first and second hydraulic assemblies, and a computer controller. The first hydraulic assembly is configured to selectively raise and lower the first bin relative to the base frame. The second hydraulic assembly is configured to selectively raise and lower the second bin relative to the base frame. The first and second hydraulic assemblies are individually actuable, and their actuation is coordinated by the controller. In another aspect, a method for transferring product using an apparatus includes inputting to a computer controller a first threshold rate of change in weight signals of a weight sensor; relaying a plurality of weight signals from the weight sensor to the controller; calculating a determination by the controller at least in part on whether the threshold rate of change has been exceeded; and automating actuation of a hydraulic assembly based on the determination.

8 Claims, 18 Drawing Sheets

Related U.S. Application Data continuation of application No. 17/130,141, filed on Dec. 22, 2020, now Pat. No. 11,491,904.

(60) Provisional application No. 62/952,781, filed on Dec. 23, 2019.

(51) Int. Cl.

| | |
|---|---|
| ***B62D 63/06*** | (2006.01) |
| ***B66F 9/065*** | (2006.01) |
| ***B66F 9/22*** | (2006.01) |
| *B62D 55/08* | (2006.01) |

(58) Field of Classification Search

USPC ............................ 298/8 R, 8 T, 13, 18, 21 R

See application file for complete search history.

(56) References Cited

U.S. PATENT DOCUMENTS

| | | | | |
|---|---|---|---|---|
| 8,177,304 | B2 * | 5/2012 | Rogers | B60P 1/34 298/18 |
| 8,670,906 | B2 * | 3/2014 | Ichinose | B60P 1/04 701/50 |
| 9,267,250 | B2 * | 2/2016 | Groeneweg | E01F 15/148 |
| 10,682,940 | B2 * | 6/2020 | Karg | B60P 1/165 |
| 2009/0200853 | A1 * | 8/2009 | Rogers | B62D 53/065 298/22 R |

* cited by examiner

MATERIAL COLLECTION AND TRANSFER CART

CROSS REFERENCE TO RELATED APPLICATION

This application is a continuation of U.S. patent application Ser. No. 17/959,413, filed Oct. 4, 2022; which is a continuation of U.S. patent application Ser. No. 17/130,141, filed Dec. 22, 2020, now U.S. Pat. No. 11,491,904; which claims the benefit of priority from U.S. Provisional Application No. 62/952,781, filed Dec. 23, 2019. These priority applications are hereby incorporated by reference in their entireties.

BACKGROUND

A harvester, combine, or other agricultural equipment used for harvesting crops pulls agricultural product from the ground in a field. Such equipment generally has a limited capacity for containing such harvested product. Thus, many harvesters have a means by which to transfer the agricultural product to another container. In some cases, the conveyance is facilitated by conveyor belts, augers, and elevators, for example. In other cases, an entire basket of the harvester is raised and inverted for dumping into another container. U.S. Pat. No. 4,059,942 to a "Cotton Harvester" and U.S. Pat. No. 4,930,297 to a "Telescoping Basket for a Cotton Harvester" both describe harvesters having hydraulic cylinders to provide a basket dump operation.

A crop collection vehicle may travel alongside the harvester to receive harvested product therefrom. In some cases, a semi-trailer truck having an open-top container is used as the product receiving vehicle. However, because such vehicles are typically quite heavy and have ground-bearing tires, their use can create ruts and other undesirable tire marks in the field. In addition, such vehicles are designed for highway travel (i.e., pavement). They are typically unstable, difficult to maneuver, and prone to becoming stuck when driven across a farm field.

Increasingly, smaller collection carts are used, which then transfer the harvested products to semi-trailer containers that wait along a perimeter of the field. However, these smaller dump box units, because they are separate from the stabilizing counterweight of a harvester, often suffer from instability when a filled container is raised into a dumping position to transfer products to a relatively tall transport truck or trailer. Such instability is addressed in U.S. Pat. No. 5,064,248 for a "High Lift Dump Box," for example.

SUMMARY

In one aspect, an apparatus comprises a base frame, first and second bins, first and second hydraulic assemblies and a computer controller. The first hydraulic assembly is configured to selectively raise the first bin from the base frame and lower the first bin onto the base frame. The second hydraulic assembly is configured to selectively raise the second bin from the base frame and lower the second bin onto the base frame. The first and second hydraulic assemblies are individually actuable, and actuation of the first and second hydraulic assemblies is coordinated by the controller.

In another aspect, a method is described for transferring product using an apparatus. The method comprises inputting to a computer controller a first threshold rate of change in weight signals of the left weight sensor; relaying a plurality of left weight signals from the left weight sensor to the controller; calculating a determination by the controller at least in part on whether the first threshold rate of change has been exceeded; and automating actuation of the first hydraulic assembly based on the determination.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

Figure 1A:
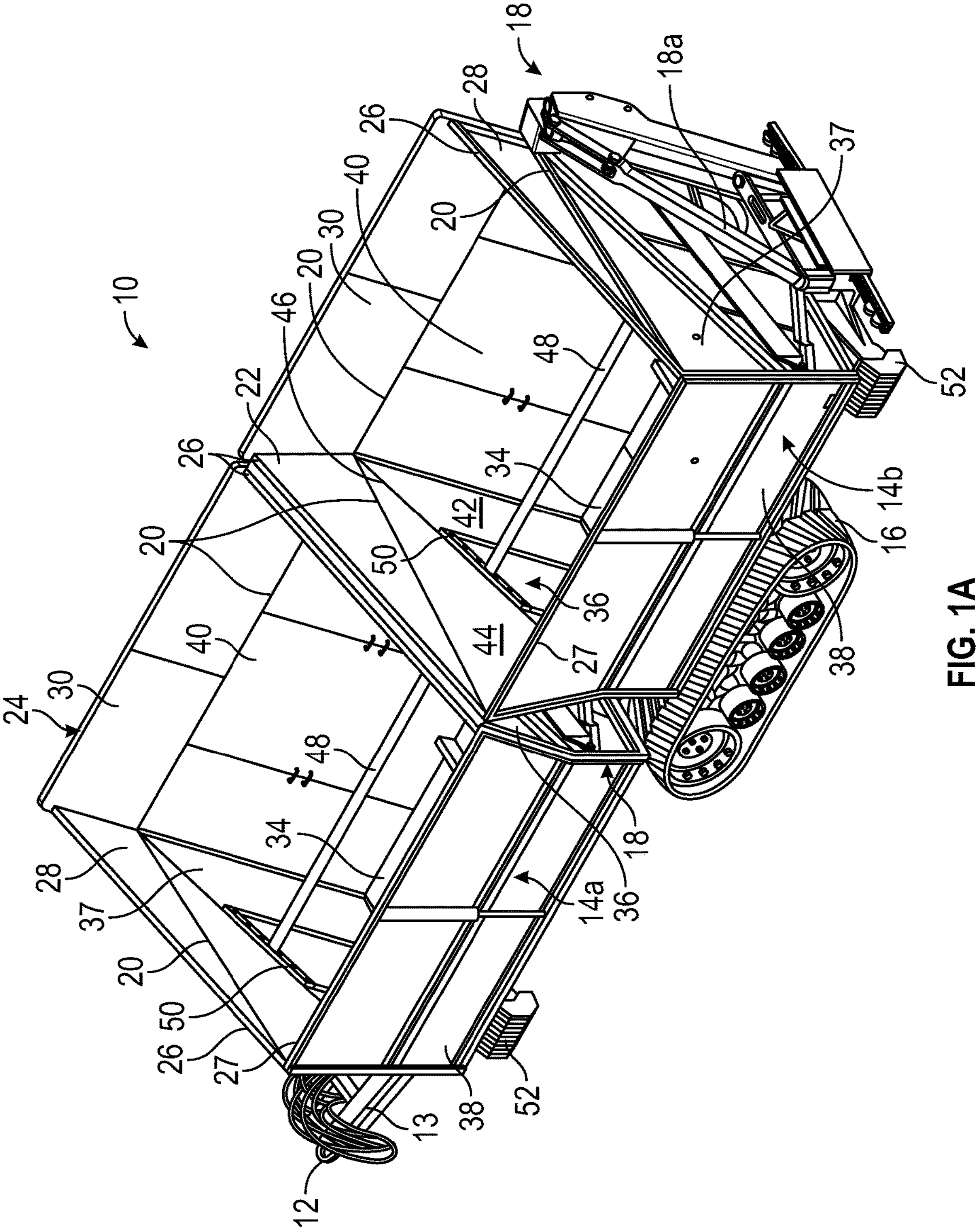
FIG. 1A is a left side and rear perspective view of an exemplary harvest collection and transfer cart.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

The drawing figures show a dual bin commodity cart 10 that is designed to be pulled behind a tractor or other agricultural vehicle attached to the cart 10 at trailer hitch coupler 12 on tongue 13. In an exemplary embodiment, cart 10 includes at least two bins 14, which are separately actuable into raised, intermediate and lowered positions. In an exemplary embodiment, cart 10 contacts a ground surface with wide tracks 16, which may exhibit up to about an 80% ground pressure reduction compared to typical vehicle tires. This advantageously allows cart 10 to travel across the ground surface with reduced compaction of soil beneath the tracks 16 and enhanced stability. In an exemplary embodiment, each bin 14 is individually actuable to raise the bin into an elevated dumping position (as shown in FIGS. 3A-3D, for example, for one of the bins 14). In some descriptions reference numeral 14 pertains to both bins; in other descriptions, front bin 14*a* and rear bin 14*b* are differentiated by the lowercase letters "a" and "b." The same convention applies to other elements as well. Moreover, while two bins 14 are illustrated, this description also applies by extension to carts including more than two bins, arranged in line on frame 32 (visible in FIG. 3A, for example).

In an exemplary embodiment, a hydraulic assembly 18 on each side of a bin 14 includes hydraulic cylinders, actuators, and frame linkage members; a frame structure formed by hydraulic assemblies 18 and base frame 32 forms a truss system that aids in the ability to maximize carrying load while minimizing the frame weight. The truss structure includes triangular base trusses 18*a*, which provide a rigid and strong arrangement while minimizing the amount of structure on the cart 10. The truss structure offers stability in the frame, allowing both bins 14 to be elevated simultaneously, without twisting or exerting extra force on base frame 32. In exemplary embodiments, base frame 32 includes I-beams for strength and rigidity. Moreover, because of the dual bin structure of an exemplary cart 10, it is contemplated that enhanced stability of the cart may be provided by methods of use in which only a single bin 14 is fully elevated at one time. While a hydraulic assembly is illustrated and described, other lifting mechanism for bin 14 can include many different constructions, including a scissors type lift or other type of elevator.

Figure 2A:
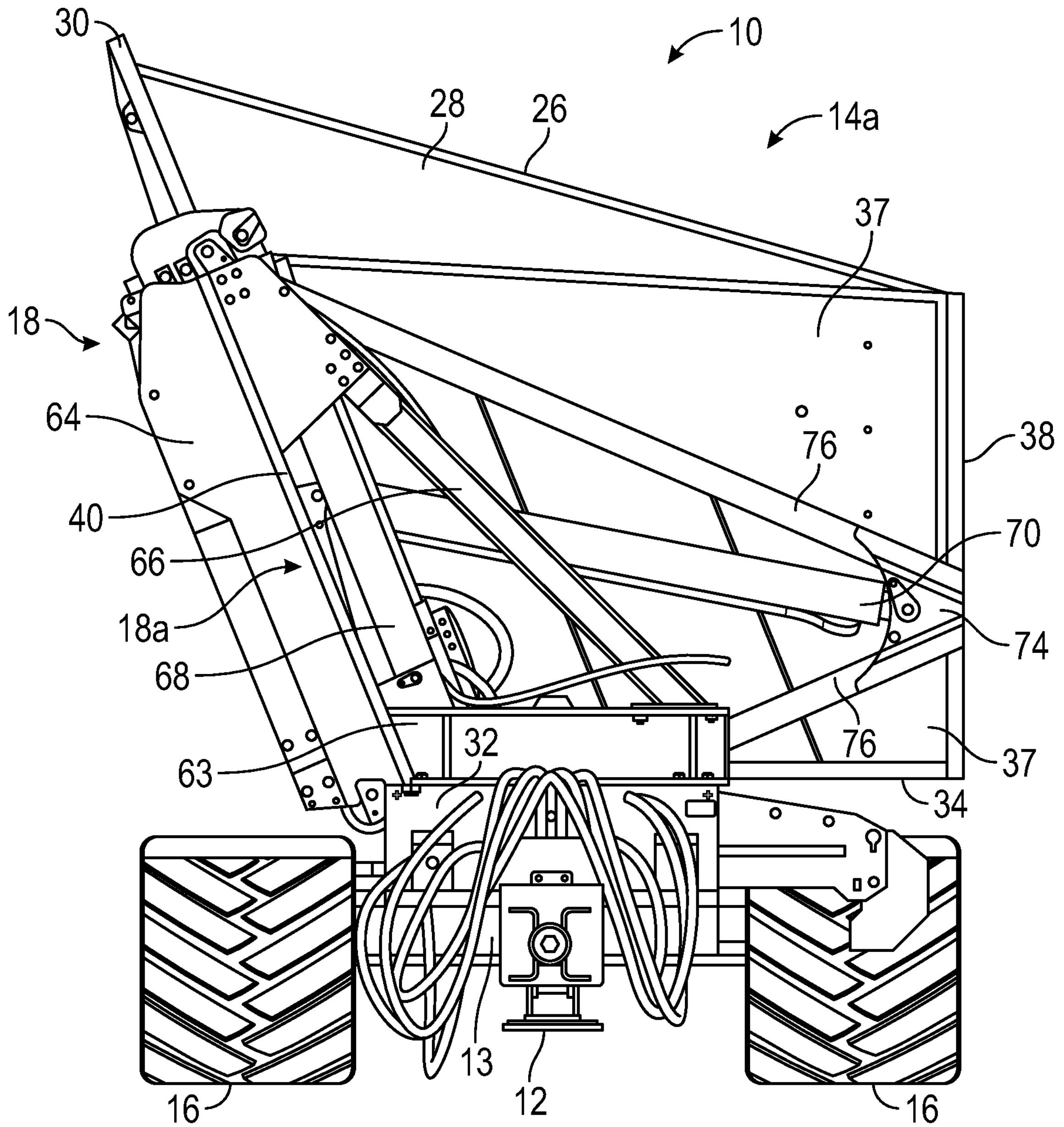
FIG. 2A is a front end view of the exemplary cart with both containers in a lowered, un-tilted position.
Figure 3A:
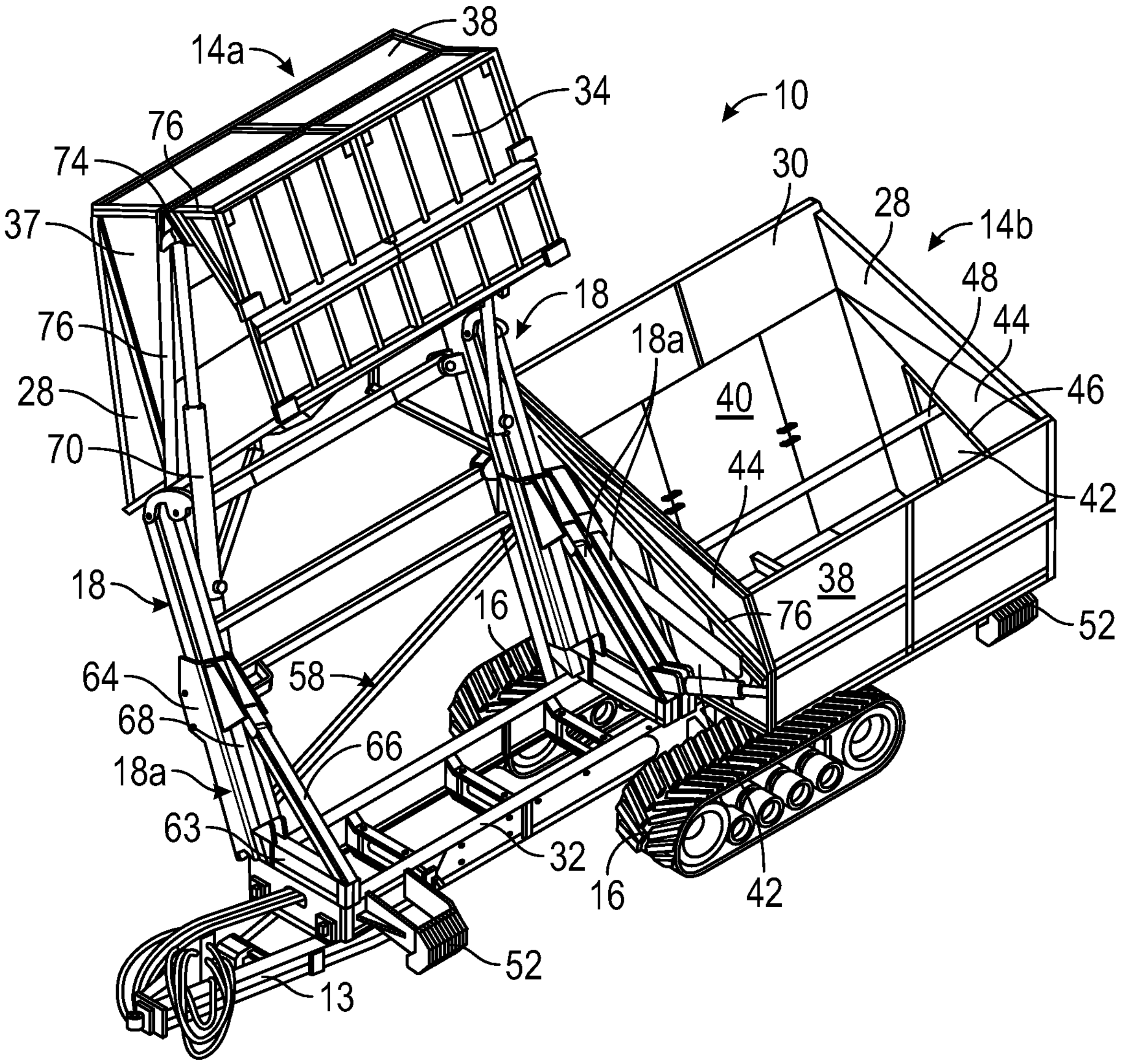
FIG. 3A is a perspective view of the exemplary cart, with the front container in a raised, tilted (dumping) configuration.
Figure 3B:
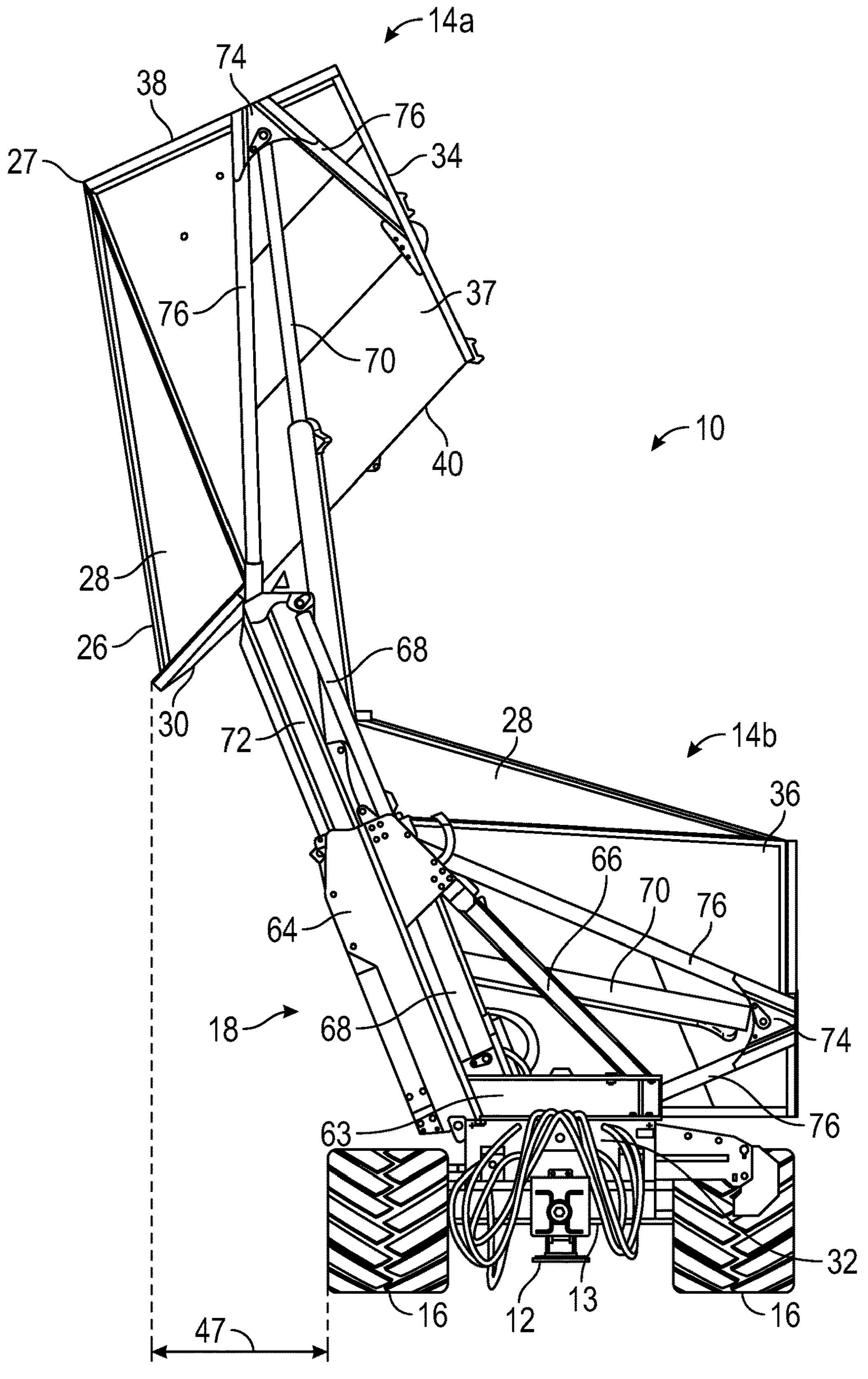
FIG. 3B is a front end view of the exemplary cart, with the front container in a raised, tilted (dumping) configuration.

In an exemplary embodiment, each bin 14 includes floor 34, interior end wall 36, exterior end wall 37, side wall 38 and slanted side wall 40. As shown in FIG. 2A, for example, such a construction substantially confines the width of cart 10 to a width within the lateral footprint extent of tracks 16. Accordingly, the cart 10 is easy to tow and maneuver, with high predictability for the operator regarding where the cart is tracking on the ground and its surroundings. Moreover, as shown in FIG. 3B, for example, the inclination of slanted side wall 40 assists in the emptying of fill matter from bin 14 due to gravity.

An optional top wall assembly 24 may be added to a bin 14. As illustrated, each bin 14 includes such an attached top wall assembly 24, which includes interior top side wall 22, exterior top side wall 28, and top back wall 30. In an exemplary embodiment, each of top walls 22, 28, 30 is hinged or otherwise moveable at joint 20 between bin 14 and top wall assembly 24. While shown in an erect or upright configuration, the components 22, 28, 30 of top wall assembly could be folded down on bin 14 or removed therefrom entirely to allow for a lower overall height of cart 10 for transport or storage purposes.

Figure 2B:
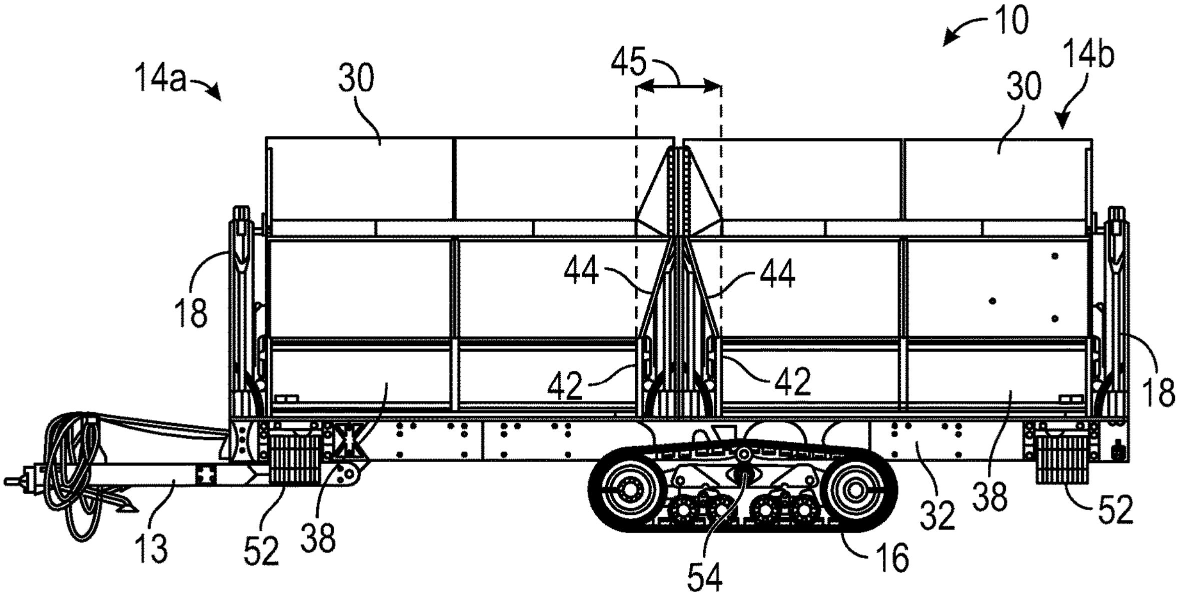
FIG. 2B is a left side view of the exemplary cart with both containers in a lowered, un-tilted position.
Figure 2C:
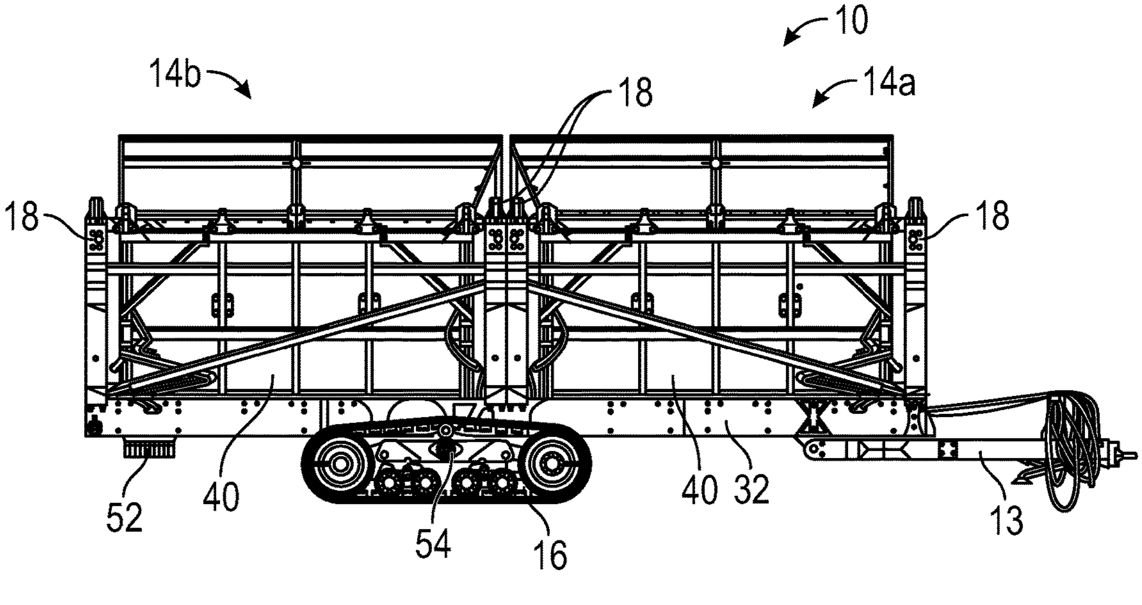
FIG. 2C is a right side view of the exemplary cart with both containers in a lowered, un-tilted position.

In general, the components of hydraulic assembly 18 are larger proximate slanted side wall 40 and narrower proximate vertical side wall 38. To maximize an interior capacity of bin 14 while keeping a total length of cart 10 relatively short, interior end wall 36 is formed by two joined panels: lower panel 42, which is substantially vertical, and upper panel 44, which is inclined outwardly from the bin interior. The panels 42, 44 meet at joint 46, which in an exemplary embodiment extends from a top of interior end wall 36 proximate slanted side wall 40 to below a vertical mid-point of interior wall 36 proximate vertical side wall 38. As shown in FIG. 2B, a space 45 between bins 14*a*, 14*b* for accommodating the two hydraulic assemblies 18 has its maximum width proximate slanted side wall 40. As shown in FIG. 1A, the upper panels 44 of adjacent bins 14 tilt toward each other to substantially meet proximate vertical side wall 38. This configuration maximizes interior space in bin 14 and serves to funnel material into and out of bin 14. While two panels 42, 44 are shown, it is to be understood that interior end wall 36 may also be formed from one or more pieces of bent material, rather than two joined panels. Interior top side walls 22 extend upward from upper panels 44 and meet at their upper edges 26 to thereby close any gap between the adjacent bins 14*a*, 14*b*. This configuration preserves product and also protects the covered hydraulic assemblies 18 from soiling. Each of exterior top side walls 28 can be similarly formed of joined lower and upper panels 42, 44, though the exterior top side walls 28 can be substantially flat, rather than exhibiting an inclined upper panel 44.

Exterior top side walls 28 and top back wall 30 increase the capacity of each bin 14 in the field by containing material that is directed from a harvester positioned to the left of cart 10, as oriented in FIG. 1A. In an exemplary embodiment, exterior top side walls 28 and top back wall 30 are removable and/or foldable from a bin 14 for road transport clearance, such as when traveling from the manufacturing facility to the customer. Moreover, the assembly of exterior top side walls 28 and top back wall 30 may be attached to bin 14 on the side opposite from the illustrated side. Additionally, in exemplary embodiments, the entire bin 14 (and associated hydraulic assembly 18) is removable from base frame 32; the bin be can rotated 180 degrees and attached to base frame 32 to face a direction opposite from the illustrated direction. Moreover, the removability of bins 14 from base frame 32 allows for customization of cart 10 with bins 14 of different shapes as desired. Additionally, if a single bin 14 is damaged, it is easily replaceable without taking the entire cart 10 out of service.

In an exemplary embodiment, a top edge 26 of each exterior top side wall 28 is sloped between the top back wall 30 and top edge 27 of a bin 14. As shown in FIG. 3B for example, this configuration extends the reach of the bin when dumping product, allowing for a greater distance 47 between the dumping cart 10 and the trailer (not shown) it is filling. This allows for reduction of product loss during product transfer from bin to trailer, even as higher cart movement and dumping operation speeds decrease precision in the placement of cart 10 relative to the trailer. Top back wall 30 also serves as an extended pouring lip along its top edge when bin 14 is in a raised, dumping configuration. While an exemplary method loads cart 10 from the "low side" (adjacent vertical side wall 38) and empties cart 10 from the "high side," (adjacent top back wall 30), it is contemplated that other methods of use for filling and emptying cart 10 in other configurations can be used.

While particular proportions are illustrated for bin 14, it is contemplated that bin 14 may have other sizes and shapes. For example, a bin may be relatively taller or shorter than illustrated. Moreover, an effective capacity of bin 14 may be adjusted with selective attachment of top back wall 30 and/or exterior top side wall 28. In an exemplary embodiment, each of top back wall 30 and exterior top side wall 28 is adjustably attachable to bin 14 at various locations to raise or lower the height of top edge 26 and top back wall 30 with respect to a floor 34 of bin 14. Such adjustability may be accomplished by sliding top back wall 30 and/or exterior top side wall 28 and securing to bin 14 at one of a plurality of discrete locations, such as by bolts, for example. Variations in effective bin size and shape may be made for receiving, containing and transferring different product materials. For example, a smaller bin may be suitable for use with a heavy product, whereas a larger bin may be suitable for a lighter product.

In an exemplary embodiment, each bin 14 optionally includes a distributor bar 48 mounted at its ends to mounting brackets 50 that are attached to exterior end wall 37 and interior end wall 36. In an exemplary embodiment, each mounting bracket 50 is longitudinally aligned parallel to edge 26 of exterior top side wall 28 or interior top side wall 22. Each distributor bar 48 can be mounted in one of a plurality of locations along a length of mounting bracket 50. A selection of the location of distributor bar 48 within bin 14 is affected by factors such as the type of material to be received within bin 14, its moisture level, the size of the particulate materials, material density, and other factors that may affect clumping of the material. When a bin 14 is tilted for dumping, distributor bar 48 assists in breaking up the mass of material as it moves past the distributor bar 48, thereby more evenly allowing for flow of the material from bin 14 into a receiving container. In some cases, distributor bar 48 prevents the fill material from falling out of bin 14 in one large mass, thereby preventing abrupt and unexpected changes in the weight and weight distribution of cart 10, thereby enhancing stability of cart 10 in an unloading operation. In an exemplary embodiment, a ballast weight 52 is provided on base frame 32 proximate the front and rear ends thereof to counterbalance the shifting weight of a bin 14 as it is lifted off the frame and tilted away from the ballast weights 52.

Figure 1B:
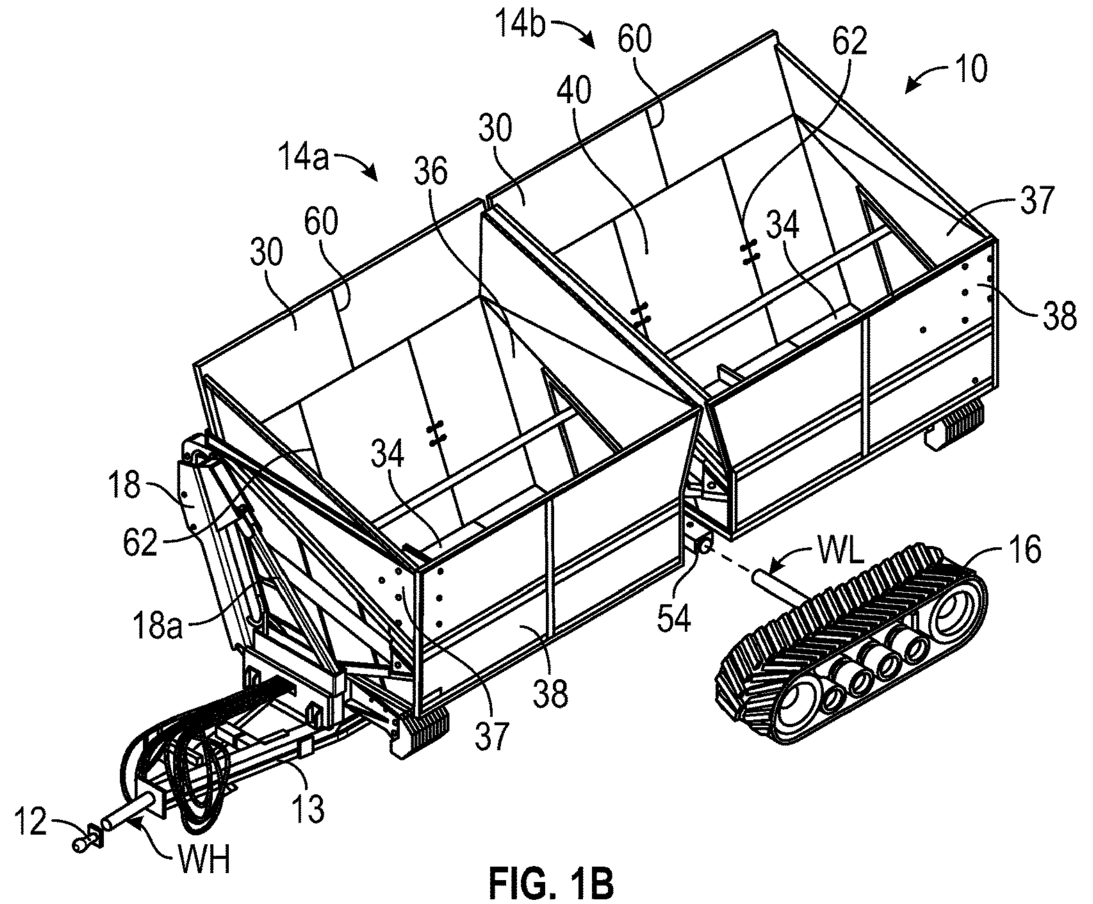
FIG. 1B is a left side and front perspective view of the exemplary cart, with an exploded view of hitch coupler and track attachment areas including weight sensors.
Figure 1C:
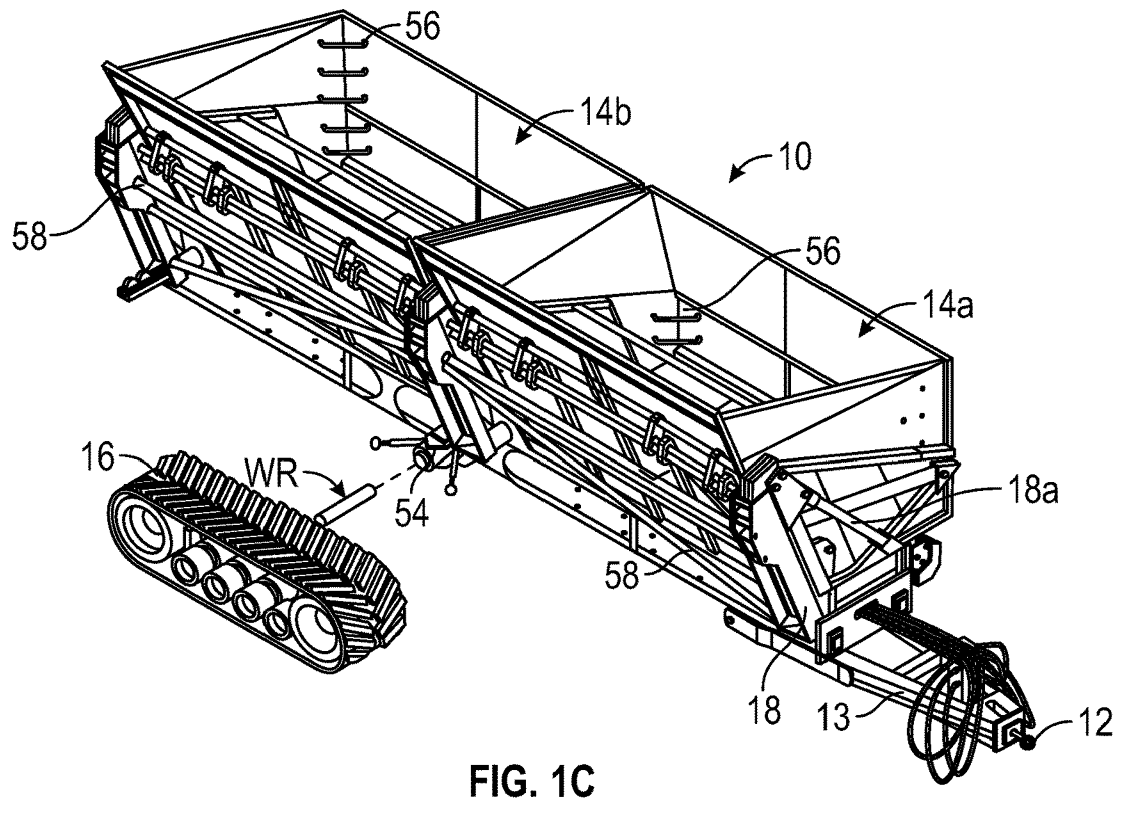
FIG. 1C is a right side and front perspective view of the exemplary cart, with an exploded view of a track attachment area including a weight sensor.

As shown in FIGS. 1B and 1C, which are partially exploded views showing track 16 and hitch coupler 12 removed from a remainder of cart 10, the cart 10 includes weight sensors positioned thereon in the form of weigh bars. The left weigh bar WL is located on a left side of the axle 54 where track 16 attaches to base frame 54. The right weigh bar WR is located on the right side of the axle 54 where track 16 attaches to base frame 54. The hitch weigh bar WH is located between the tongue 13 and hitch coupler 12 at the front of cart 10.

As shown in FIG. 1C, climbing rungs 56 can be attached, such as by bolts, to one or more interior surfaces of bin 14. The climbing rungs 56 allow an operator to climb into and out of bin 14. FIG. 1C additionally shows the right frame assembly 58 extending between the hydraulic assemblies 18 of a bin 14. In this description, while terms such as left and right, front and back, top and bottom, etc. are used for ease of reference with respect to the embodiment, it is to be understood that components may be oriented otherwise. In the illustrated embodiment, each of the floor 34, top back wall 30, interior end wall 36, exterior end wall 37, vertical side wall 38, and slanted side wall 40 is composed of a plurality of sheets of material connected to each other, such as by the use of known sheet metal connectors and/or welding. For optimal strength and rigidity of an assembled bin 14, it is preferable, such as shown in FIG. 1B, that seams between panels are not aligned between components. For example, as shown in FIG. 1B, seam 60 of top back wall 30 is offset so that it is not contiguous with seam 62 of slanted side wall 40. In other embodiments, each of the walls may be formed of an integral, single piece of material.

As shown in FIG. 2A, in an exemplary embodiment, hydraulic assembly 18 includes a triangular base truss 18*a* consisting of frame members 63, 64 and 66, which are connected to each other in a triangular arrangement by conventional connection plates and fasteners. In an exemplary embodiment, the components of triangular base truss 18*a* are rigidly connected to each other, with frame member 64 being aligned parallel with slanted side wall 40 and extending for a height of slanted side wall 40. The frame member 66 is connected to a top portion of frame member 64 and a left side of frame member 63. In an exemplary embodiment, hydraulic assembly 18 also includes lift cylinder 68 and tilt cylinder 70. In an exemplary embodiment of cart 10, each of the hydraulic assemblies 18 on either side of each bin 14 are identical to each other, though attachment mechanisms may be mirror images of each other, depending on whether the attachment is proximate interior end wall 36 or an exterior end wall 37.

FIG. 2A is a front end elevation view of cart 10 with both bins 14 in the lowered position of FIG. 1. FIG. 3B is a front end elevation view of the cart 10 wherein the front bin 14*a* is raised and tilted. For front bin 14*a*, both lift cylinder 68 and tilt cylinder 70 are extended. For rear bin 14*b*, both lift cylinder 68 and tilt cylinder 70 are in their neutral, retracted configurations. For the raised and tilted bin 14*a*, it can be seen that a bottom end of lift cylinder 68 is attached to frame member 63, while a top end of lift cylinder 68 is attached to the top of a telescoping, extending portion 72 of frame member 64. One end of tilt cylinder 70 is pivotally connected to frame member 64 or another frame component near frame member 64, while the opposite end of tilt cylinder 70 is pivotally connected to a plate 74 between upper and lower end frame members 76. As shown in FIG. 3A, in an exemplary embodiment, at each of interior end wall 36 and exterior end wall 37, the upper end frame member 76 is positioned outside bin 14 at the same location as joint 46 between lower panel 42 and upper panel 44.

The bins 14 are independently operable. The two hydraulic assemblies 18 of each bin 14 are of course operated in unison; however, on a cart 10, each of the bins 14 may be in any position between one extreme of being fully lowered and un-tilted and the opposite extreme of being fully raised and fully tilted. Independent actuation of the hydraulic assemblies 18 of the separate bins 14 can be provided by conventional means, including remote control by a human operator positioned in a tractor 114 (labeled in FIG. 10) that pulls the cart 10, for example.

Figure 3C:
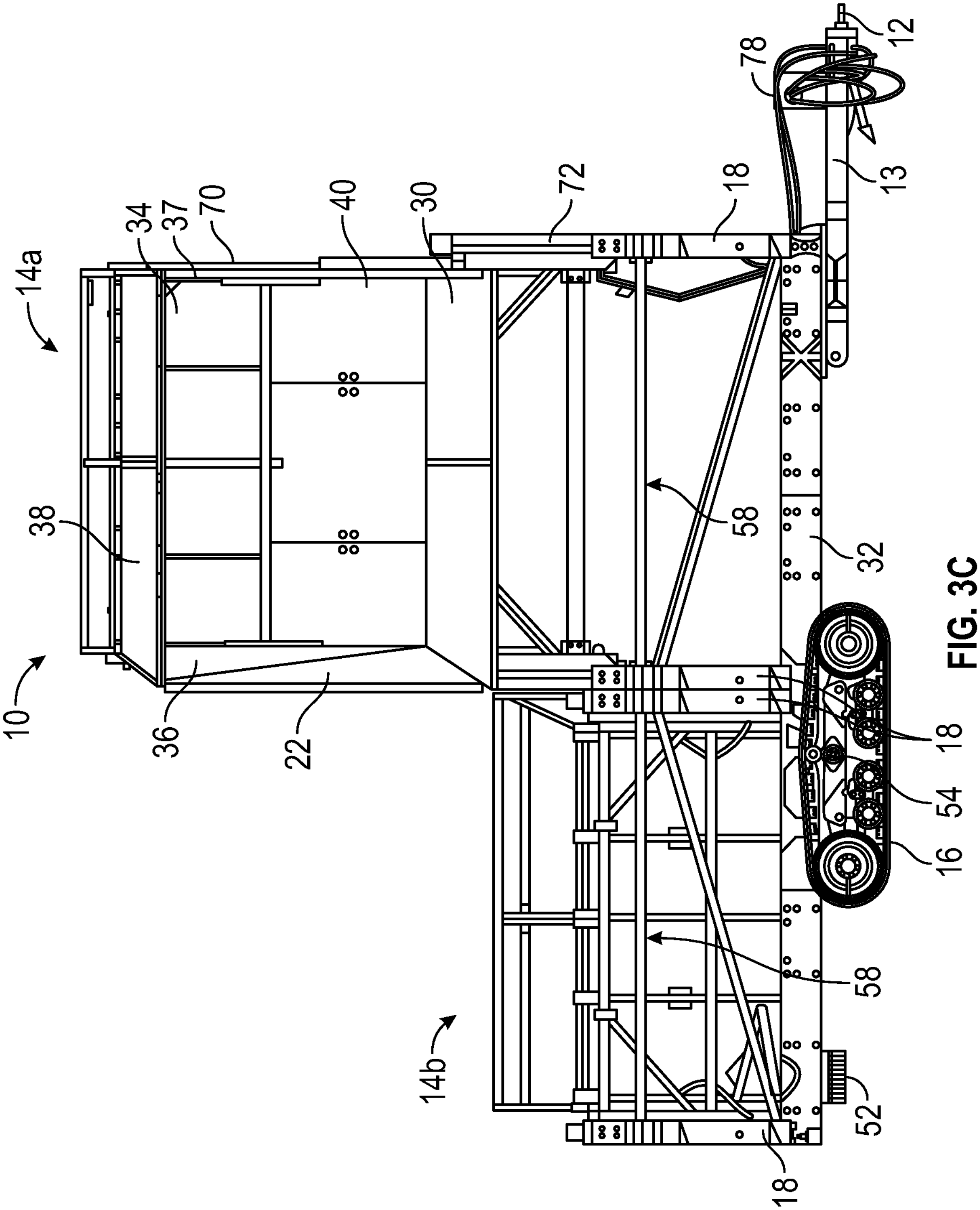
FIG. 3C is a right side view of the exemplary cart, with the front container in a raised, tilted (dumping) configuration.
Figure 3D:
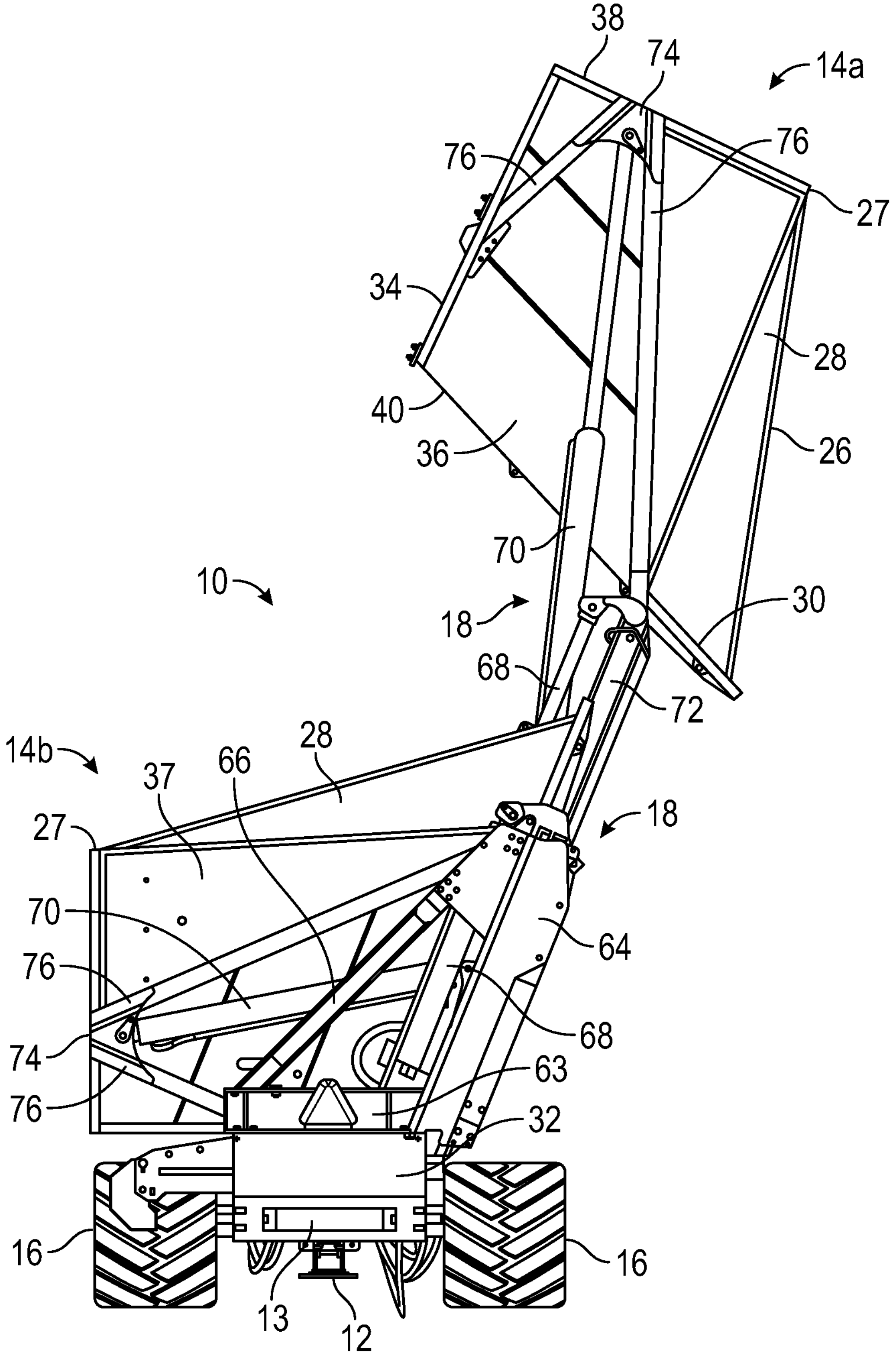
FIG. 3D is a rear end view of the exemplary cart, with the front container in a raised, tilted (dumping) configuration.

As shown in FIG. 3C, track 16 is connected to base frame 32 at axle 54, which is offset from a longitudinal midpoint of base frame 32. The positioning of the ground engaging components of cart 10 rearward of longitudinal midpoint results in provides for more even distribution of weight between the ground engaging track 16 of cart 10 and the ground engaging wheels or tracks of a towing vehicle (e.g., tractor 114) attached at hitch coupler 12.

Figure 4A:
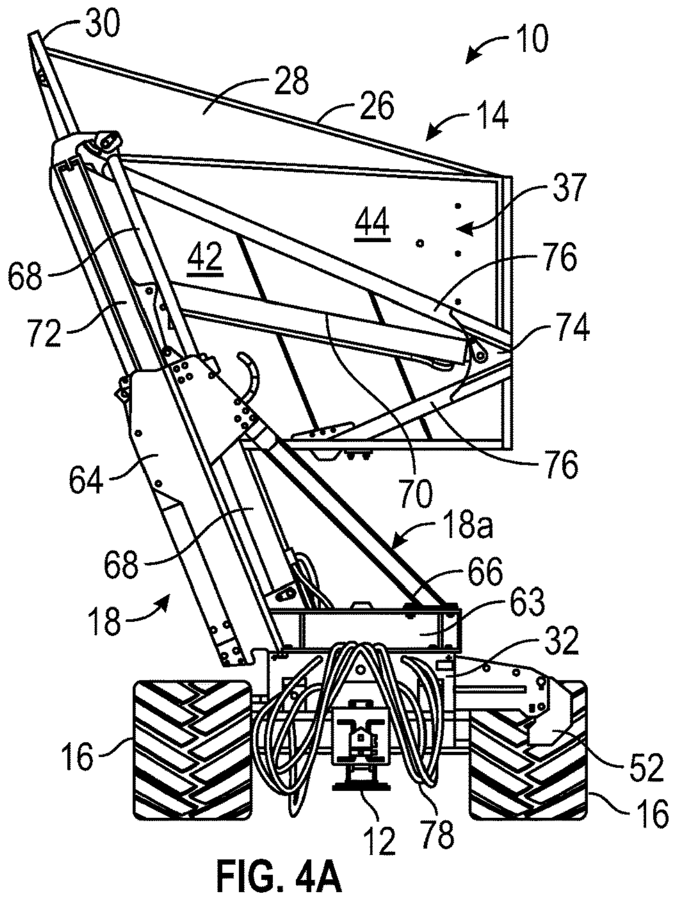
FIG. 4A is a front end view of the exemplary cart with both containers in a raised, un-tilted position.
Figure 4B:
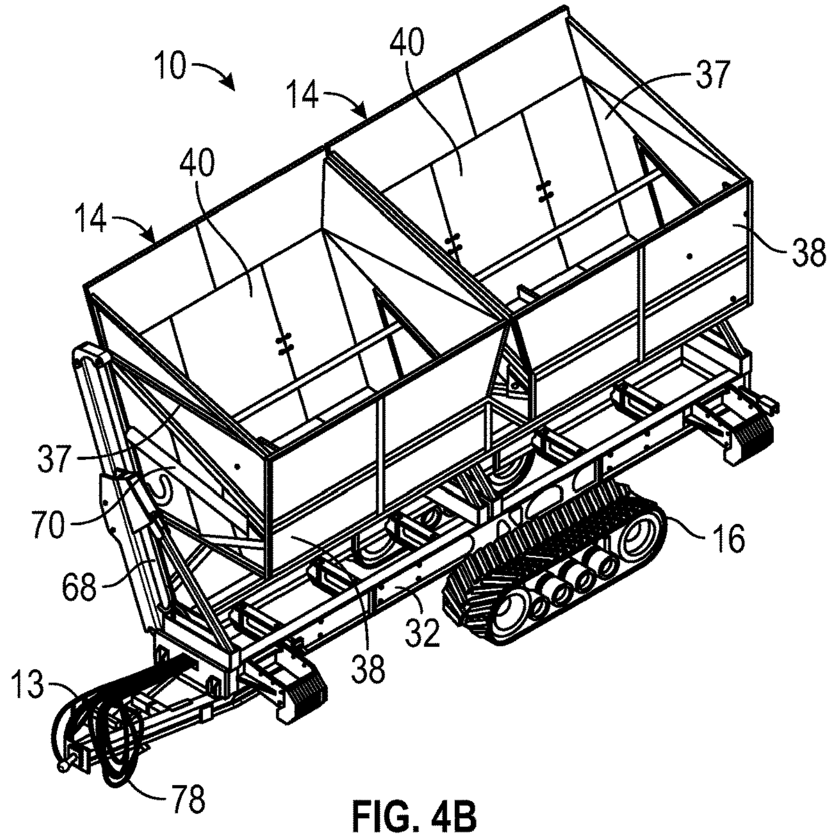
FIG. 4B is a front, left perspective view of the exemplary cart with both containers in a raised, un-tilted position.
Figure 5A:
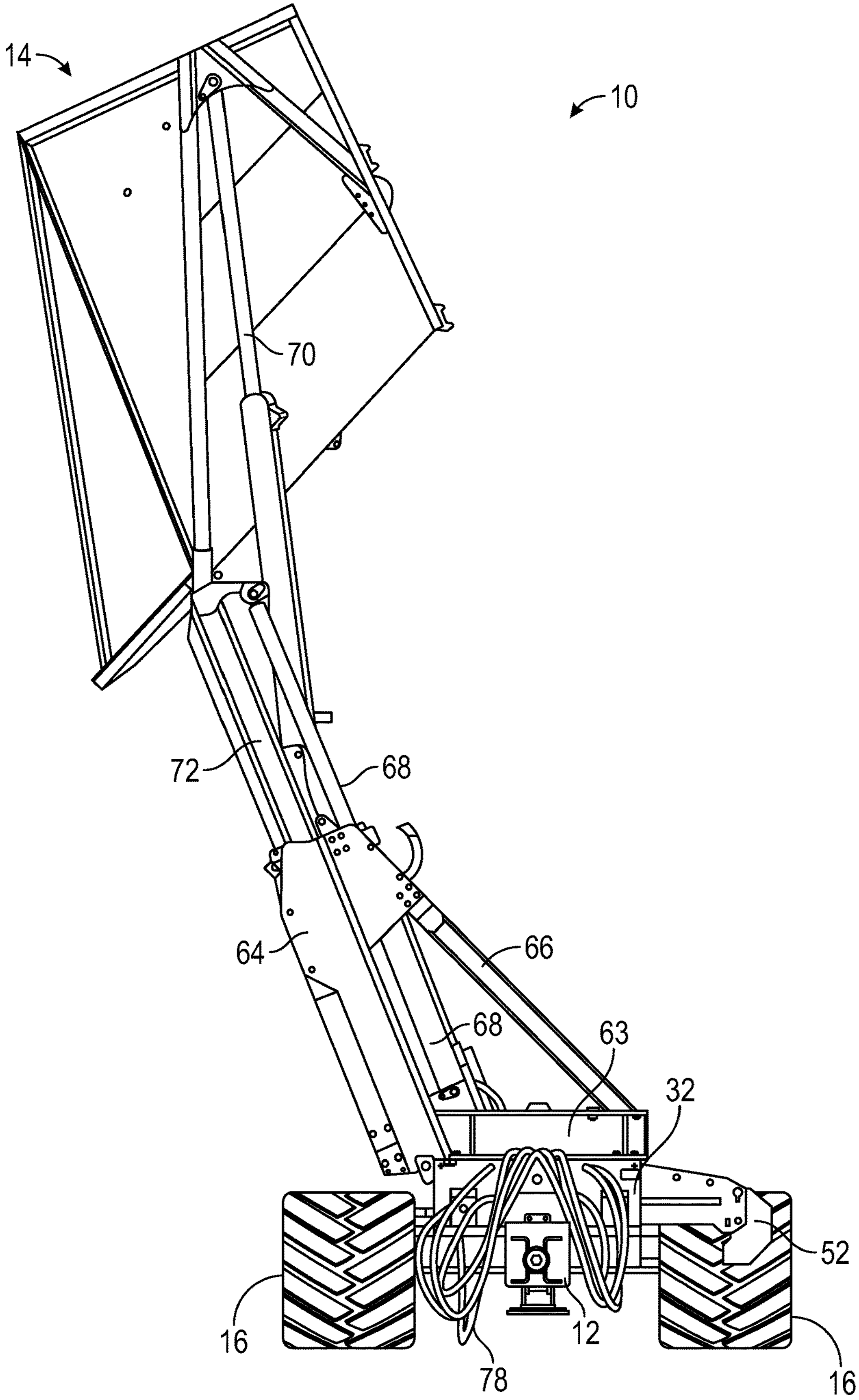
FIG. 5A is a front end view of the exemplary cart with both containers in a raised, tilted position.
Figure 5B:
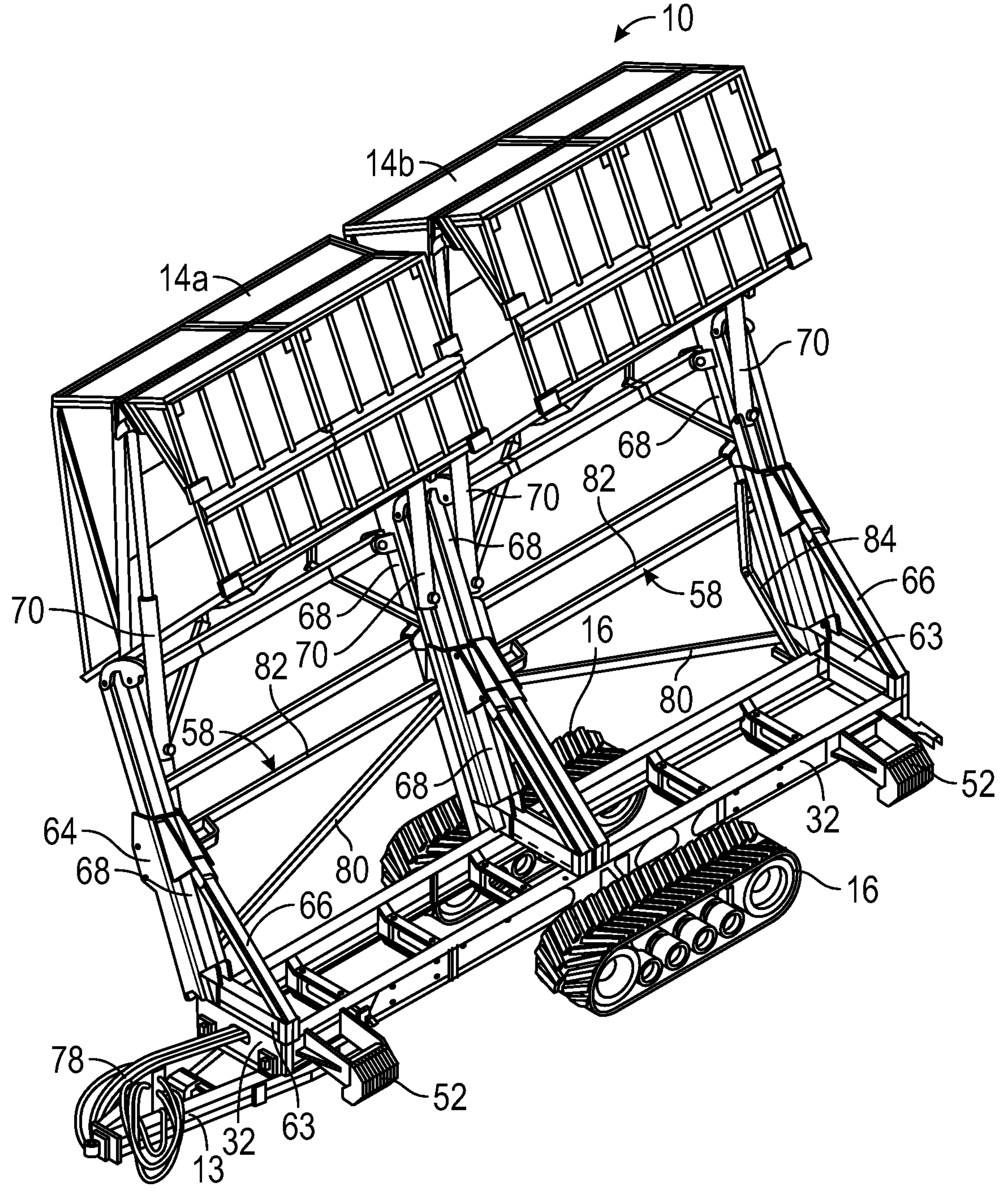
FIG. 5B is a front left perspective view of the exemplary cart with both containers in a raised, tilted position.
Figure 6A:
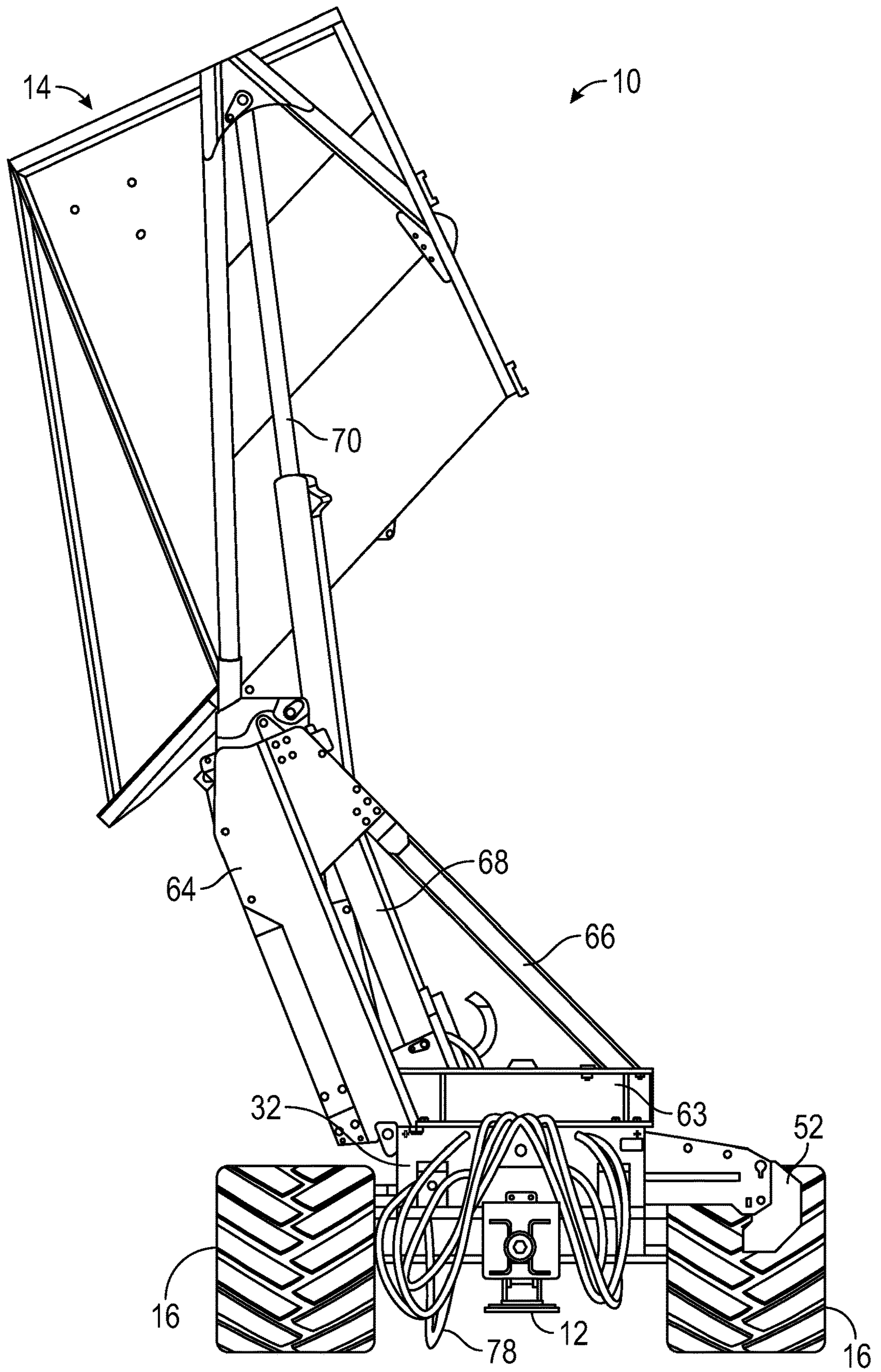
FIG. 6A is a front end view of the exemplary cart with both containers in a lowered, tilted position.
Figure 6B:
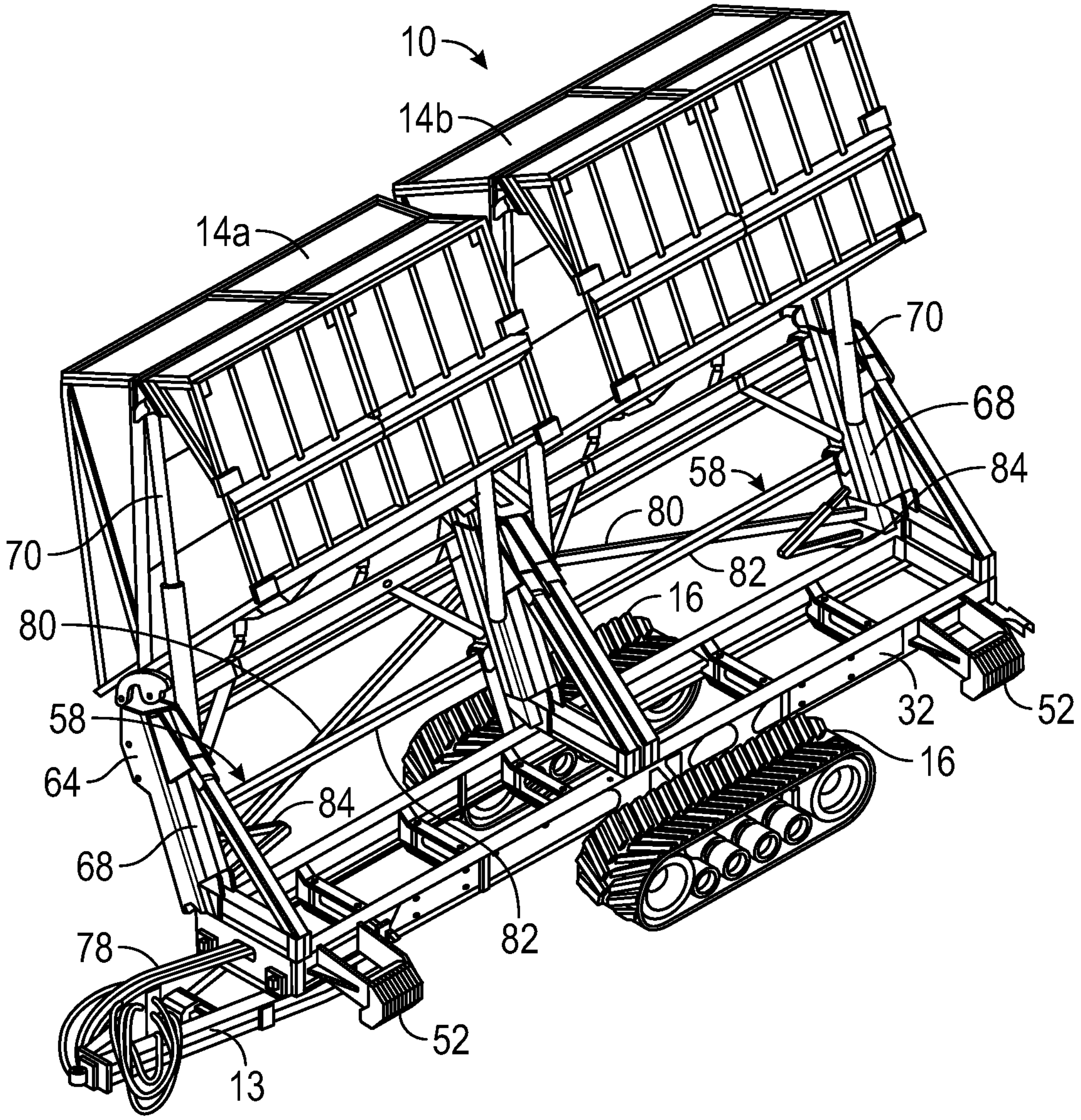
FIG. 6B is a front left perspective view of the exemplary cart with both containers in a lowered, tilted position.

FIGS. 4A and 4B show cart 10 with both bins 14 in raised but un-tilted positions. Thus, all of the lift cylinders 68 are extended, while all of the tilt cylinders 70 remain retracted. FIGS. 5A and 5B show both bins 14 of cart 10 lifted and tilted. Thus, all of the lift cylinders 68 are extended. Additionally, all of the tilt cylinders 70 are extended. In an exemplary embodiment of cart 10, each of the lift cylinders 68 and tilt cylinders 70 is a hydraulic cylinder actuated by fluid pressure flowing to the respective cylinder 68, 70 through hydraulic lines 78 from an on-board or tractor-based hydraulic system 110 (labeled in FIG. 10). In FIGS. 6A and 6B, cart 10 is shown in a configuration in which both bins 14 are in an un-lifted but tilted position. Thus, in this case, all lift cylinders 68 are retracted and all tilt cylinders 70 are extended.

In comparison of FIG. 5B and FIG. 6B, in which the only difference is the state of lift cylinder 68, it can be seen that in the illustrated embodiments, right frame assembly 58 includes a diagonal frame member 80 connecting the two frame members 64 of an individual bin 14; a horizontal frame member 82 connects lift cylinders 68. Further, as shown in FIG. 6B, linkage 84 is contracted when lift cylinder 68 is retracted. As shown in FIG. 5B, linkage 84 is expanded when lift cylinder 68 is extended.

Figure 7:
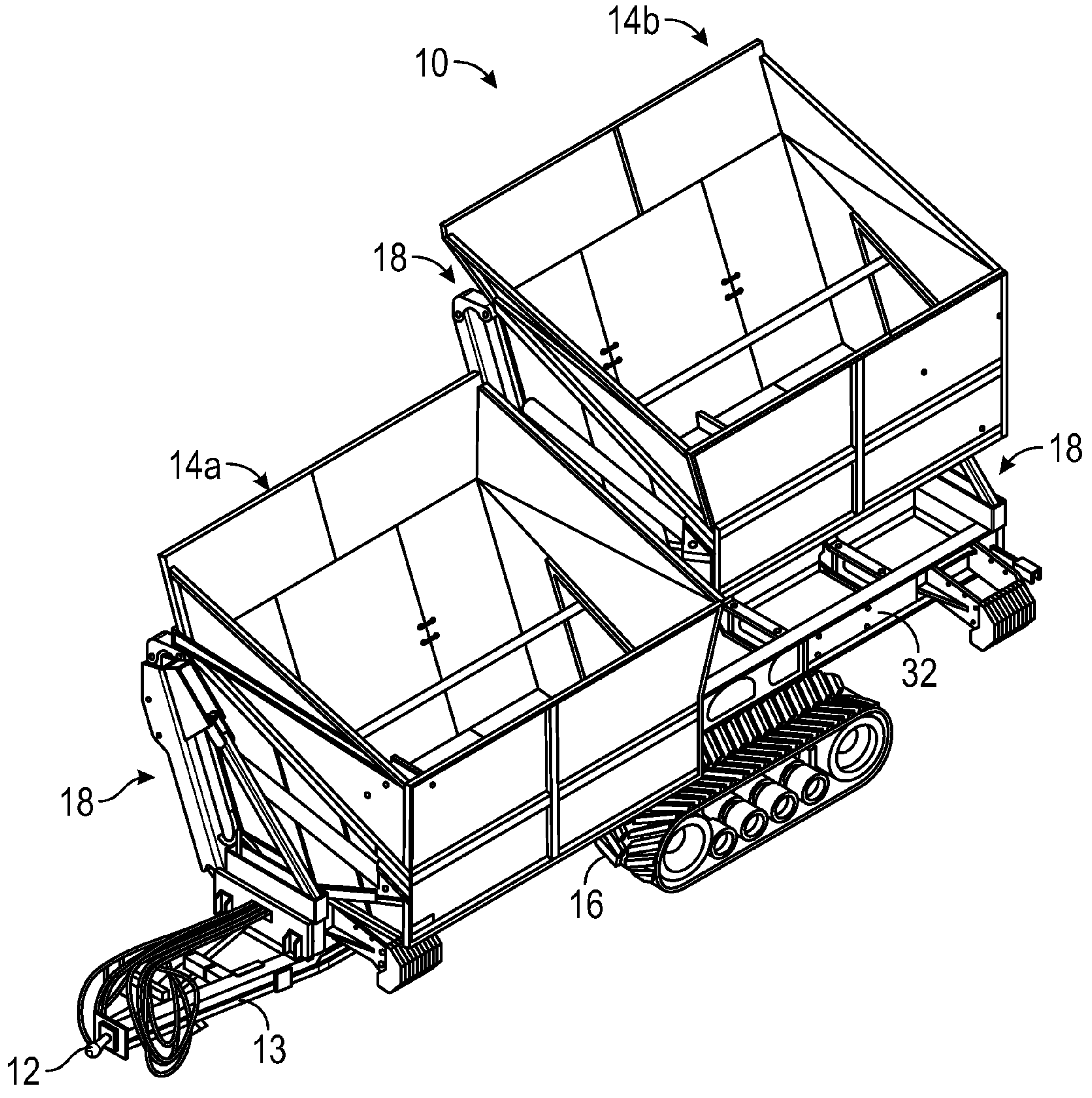
FIG. 7 is a front left perspective view of the exemplary cart with the front container lowered, the rear container raised, and both containers un-tilted.
Figure 8A:
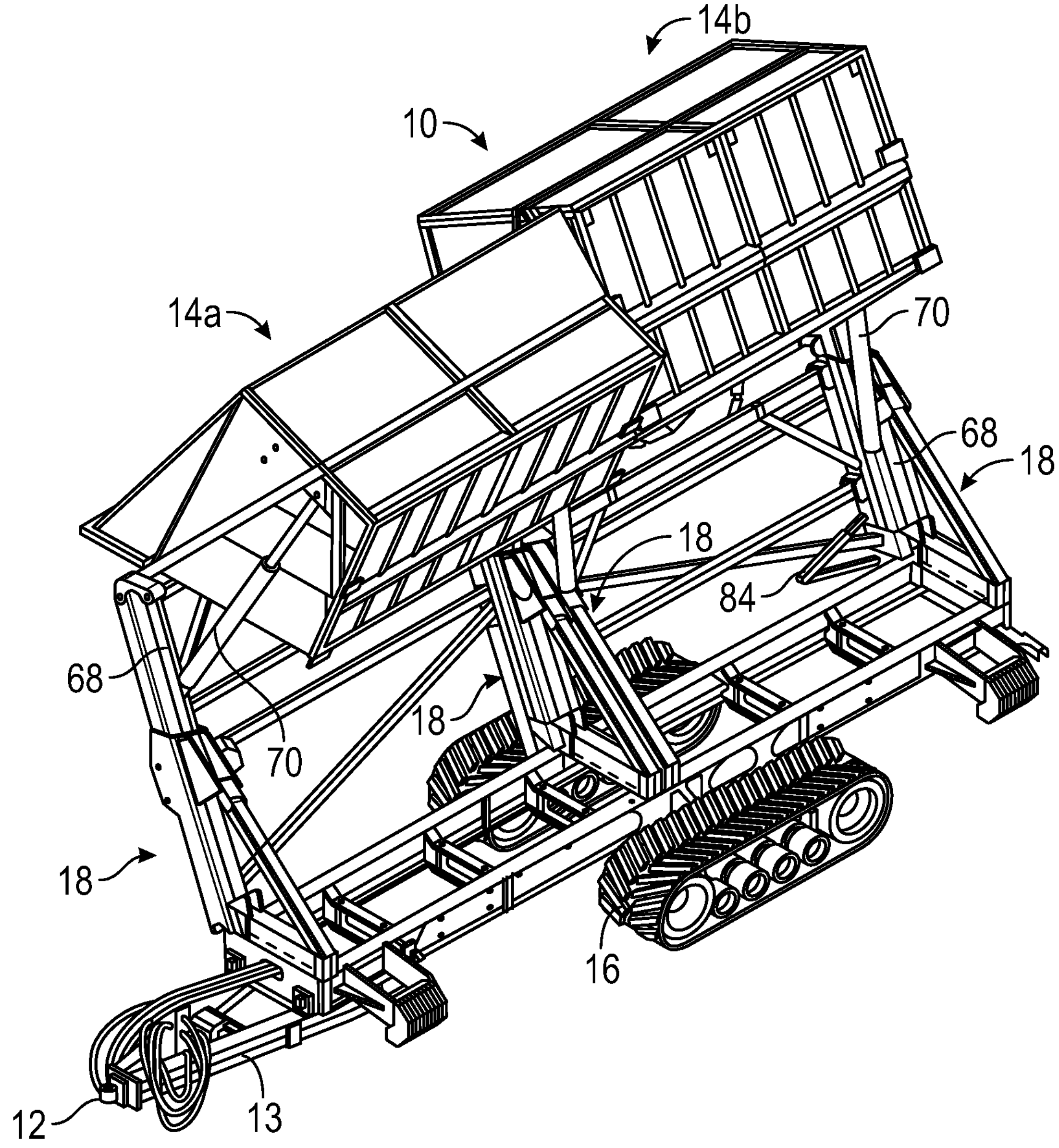
FIG. 8A is a front left perspective view of the exemplary cart with the front container raised and partially tilted, while the rear container is lowered and fully tilted.
Figure 8B:
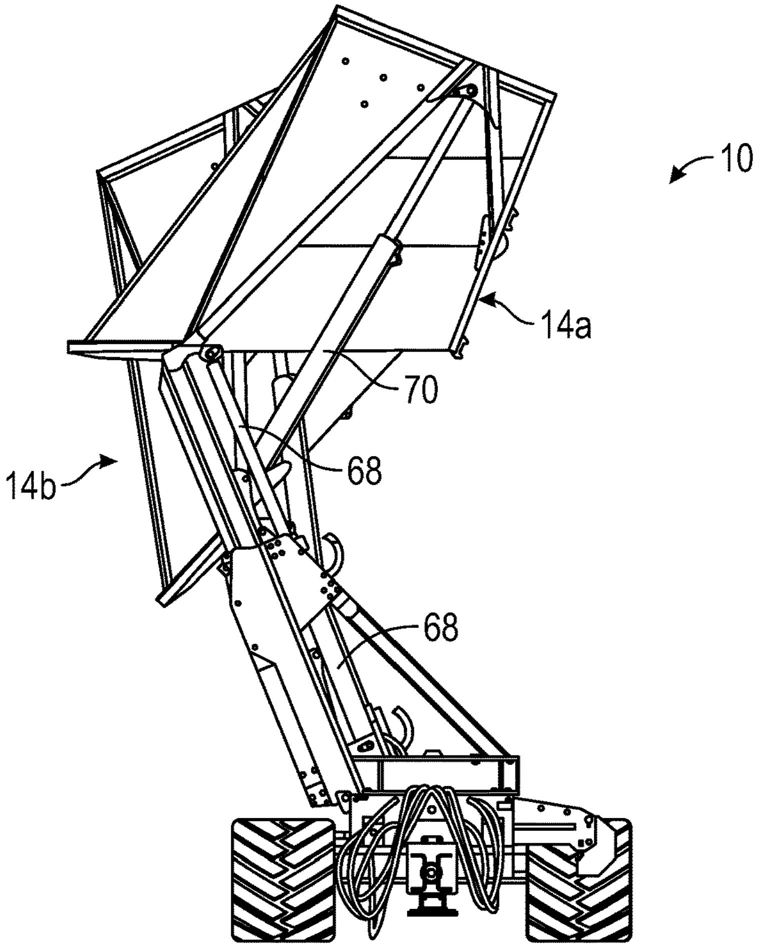
FIG. 8B is a front end perspective view of the exemplary cart with the front container raised and partially tilted, while the rear container is lowered and fully tilted.
Figure 8C:
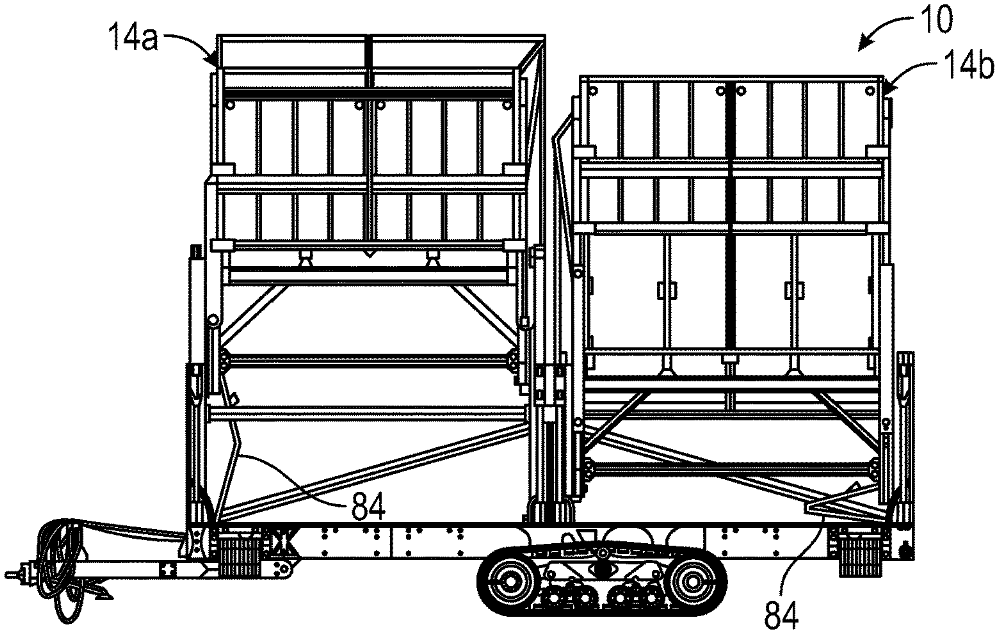
FIG. 8C is a left side view of the exemplary cart with the front container raised and partially tilted, while the rear container is lowered and fully tilted.

FIG. 7 shows cart 10 with front bin 14*a* lowered and un-tilted, while rear bin 14*b* is raised and un-tilted. FIGS. 8A-8C show a configuration of cart 10 in which front bin 14*a* is fully raised and partially tilted, and rear bin 14*b* is lowered and fully tilted. Thus, it can be seen that, subject to a control system 98 to prevent tipping of the cart 10, the pair of lift cylinders 68 and pair tilt cylinders 70 for a particular bin 14 are independently actuable to any extent between a fully retracted configuration and a fully extended configuration. For example, FIGS. 8A-8C show, for front bin 14*a*, full extension of lift cylinder 68 and partial extension of tilt cylinder 70. In contrast, for rear bin 14*b*, lift cylinder 68 is fully retracted and tilt cylinder 70 is fully extended.

Figure 9A:
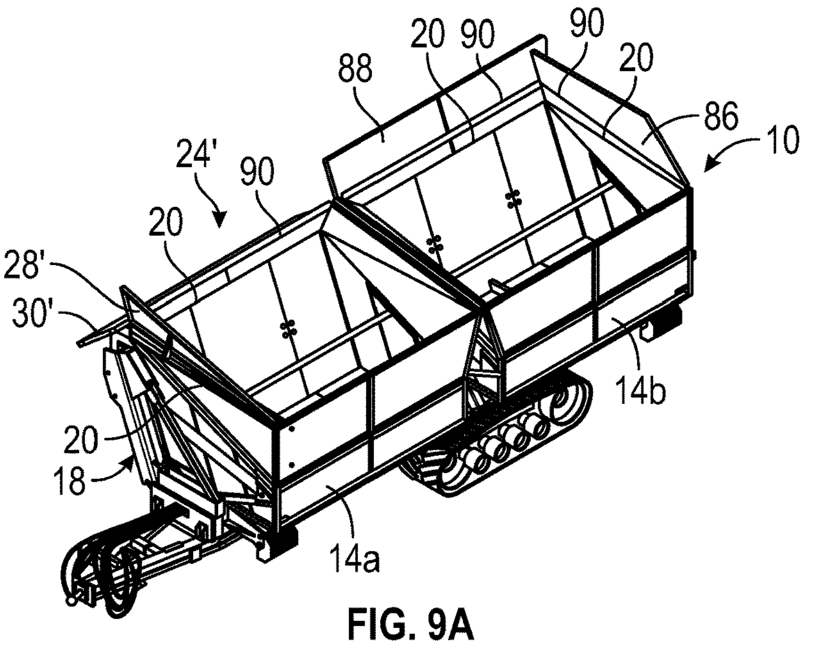
FIG. 9A is a perspective view of an exemplary cart with a second embodiment of a top wall assembly.
Figure 9B:
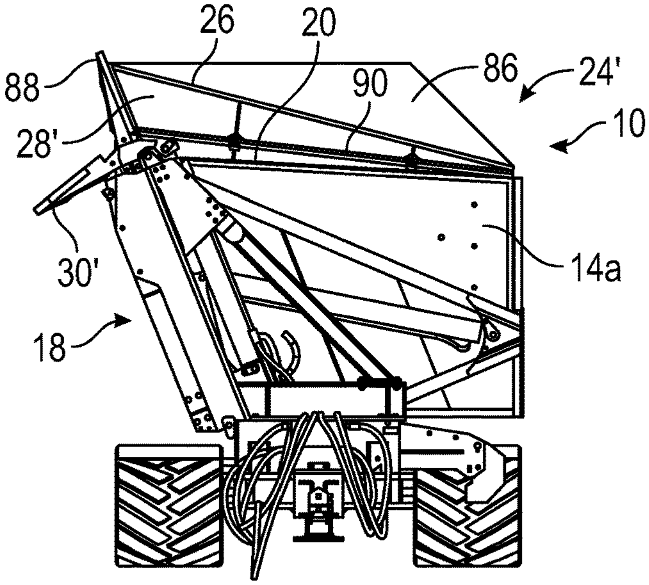
FIG. 9B is a front end view of the cart with the top wall assembly of FIG. 9A.
Figure 9C:
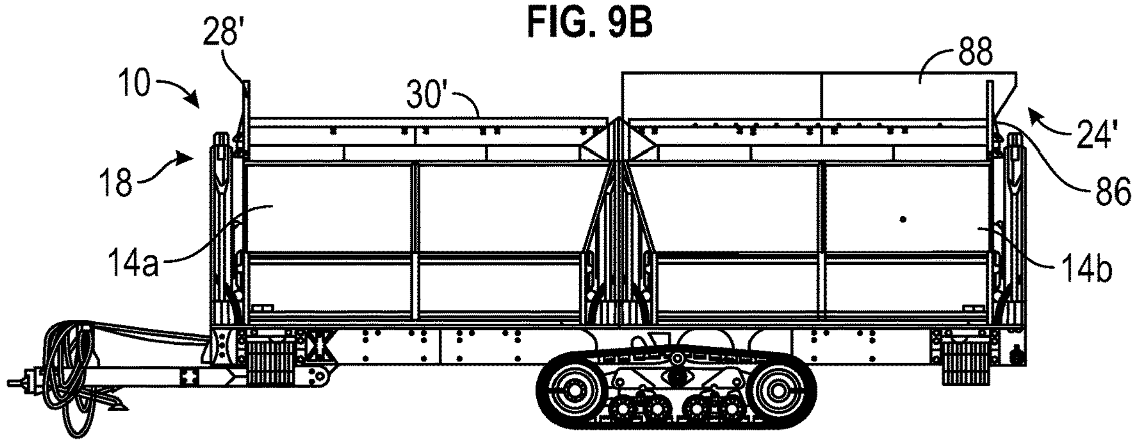
FIG. 9C is a left side view of the cart with the top wall assembly of FIGS. 9A and 9B.

FIGS. 9A-9C show a cart 10 with a second embodiment of a top wall assembly 24'. Interior top side walls 22 of both bins 14 are the same as those in the first embodiment of top wall assembly 24. In some applications, it is desirable to have a taller backstop 86 compared to exterior top side wall 28 on rear bin 14*b*. This prevents loss of product from a rear of cart 10 as it is filled, moved through a field and/or tilted to transfer product to a trailer. Moreover, in the illustrated embodiment of FIGS. 9A-9C, rear bin 14*b* includes extended top back wall 88 rather than top back wall 30, 30'. As seen most clearly in FIG. 9C, the extended top back wall 88 is longer at a top edge than bin 14*b*, thereby allowing backstop 86 to be attached thereto with a rearward inclination. With such an inclination, backstop 86 further serves to catch material that is flowing rearward of the cart 10 and funnel it into the bin 14*b*. In the illustrated embodiment, exterior top side wall 28', top back wall 30', backstop 86 and extended top back wall 88 each may have a two-piece construction with a hinge 90, thereby allowing the top wall components 28', 30', 86 and 88 to be folded in two pieces to the outside of bins 14, to drape over the hydraulic assemblies 18. In the illustrated embodiment, the various components 28', 30, 86 and 88 of top wall assembly 24' are shown in various different positions relative to their respective bins 14*a*, 14*b*. In the illustrated example, such variations and position are accomplished with hinges at joint 20 between the bin 14 and its respective top wall assembly components and hinges 90. Suitable position locking mechanisms can be used to hold the top wall components 28', 30', 86 and 88 in folded or unfolded configurations as desired.

Interior top side walls 22 and backstop 86 (or exterior top side wall 28) are provided to direct deposited materials (not shown) into the interiors of bins 14. Interior top side walls 22 are provided over hydraulic assemblies 18 to protect the hydraulic assemblies from impact from falling product and to reduce loss of product material. Fill or deposited material can include any articles, but most commonly commodity materials such as, for example, a harvested crop product like silage, grain, vegetables, fruits, tubers, or other produce, granular or particulate materials or the like.

In an exemplary method of use, cart 10 is pulled behind a tractor 114 and follows alongside a harvester (not shown) to receive harvested product therefrom. While the illustrated embodiments show that the bins 14 have top wall 30, 30', 88 on one side, it is contemplated that they may have top wall 30, 30', 88 on the opposite side. In one embodiment, base frame 32 may include a second hitch coupler 12 on an opposite end from the illustrated hitch coupler 12 for pulling other implements behind cart 10. While use of cart 10 has been described with reference to agricultural products, it is contemplated that cart 10 can be used to carry any type of material from one location to another. The open structure of bins 14 allows cart 10 to accept commodities of many sizes and shapes.

In an exemplary embodiment, the dual bins 14 of cart 10 together have a capacity that is substantially similar to that of a typical dry bulk hopper semi-trailer container. Because of the large capacity, little interruption in the harvesting operation is required for moving carts 10 on and off the field in order to empty harvested product into a waiting semi-trailer container, typically positioned at an edge of the field. In an exemplary embodiment, a volumetric capacity of cart 10 is at least about 1500 cubic feet, more preferably at least about 1800 cubic feet, and most preferably about 2,000 cubic feet (which is approximately the volumetric capacity of a dry bulk hopper trailer). Thus, methods of transferring material from cart 10 to a semi-trailer container advantageously fill the semi-trailer container with a single load from cart 10. Because the cart 10 can fill the semi-trailer container in one trip, increased productivity is realized.

In an exemplary embodiment, cart 10 uses two tracks 16, though other ground surface engagement elements can be used, such as tires and wheels, for example. Because of the wide track 16, which has a ground surface contact area of 3 feet by about 12.3 feet, little soil compaction is experienced by use of cart 10. Approximate dimensions of cart 10 include an overall length of about 40 feet, a height of about 12 feet, and a width of about 12 feet. An exemplary loaded ground pressure is about 15.3 pounds per square inch. When a bin 14 is raised, as shown in FIGS. 4A and 4B, an exemplary vertical travel distance of the bin is about 5 feet.

While a cart 10 with two bins 14 is illustrated and described, it is contemplated that such a harvest collection and transfer cart can include more bins arranged in any array. Each bin 14 may occupy any vertical position from fully lowered to fully raised and any intermediate position between those extremes. Moreover, each bin 14 may occupy any tilt position from fully flat (i.e., no tilt) to fully tilted and any intermediate position between those extremes. For example, after a raised and tilted front bin 14*a* has been emptied into a waiting container, the empty bin 14*a* can be lowered partially. This allows an operator in a towing vehicle such as tractor 114 to have a partial view of the still full rear bin 14*b* in order to visually monitor its raising and lowering operation while the empty bin 14*a* is at least partially lowered to enhance stability of the overall cart 10.

While the first and second hydraulic assemblies 18 for the first and second bins 14*a* and 14*b*, respectively, are individually actuable, their actuation can be coordinated. For example, exemplary methods allow control of one of the hydraulic assemblies 18 based on the position state of the other hydraulic assembly 18. The control method may be electrical, mechanical, or hydraulic in nature (or a combination thereof). Such control is configured to maintain stability of cart 10 and can also affect stability of the trailer or container receiving material dumped or otherwise transferred from cart 10.

Figure 10:
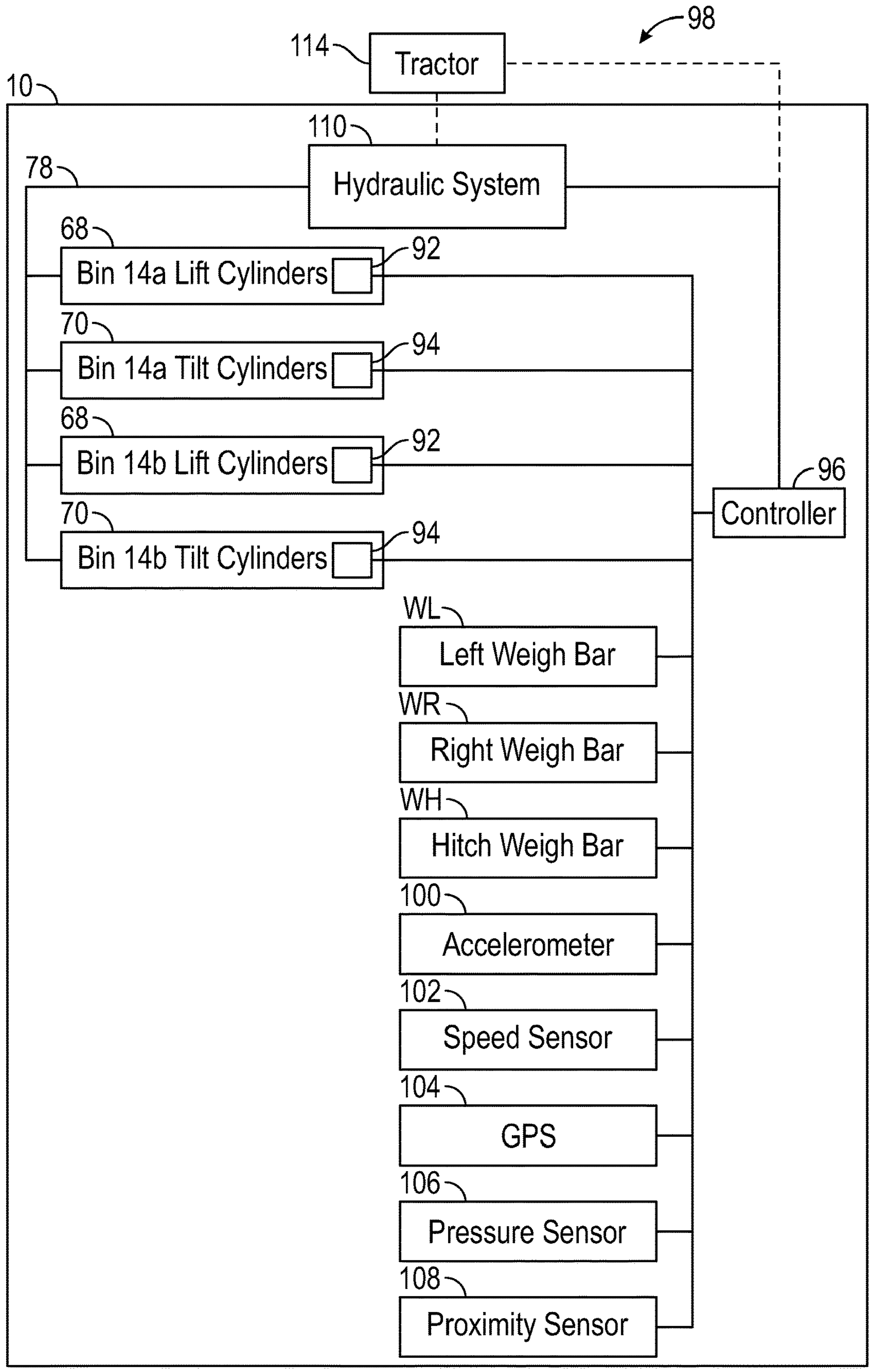
FIG. 10 is a schematic diagram of an exemplary cart control system.

As schematically shown in FIG. 10, in an exemplary embodiment of control system 98 for cart 10, position sensors 92 are incorporated into the lift cylinders 68 and position sensors 94 are incorporated into the tilt cylinders 70. While many types of position sensors may be used, a particularly suitable type is a Hall Effect linear position transducer. One exemplary position sensor 92, 94 is a linear transducer of the LA/B series from Rota Engineering Ltd. of Manchester, United Kingdom. Another exemplary mobile hydraulic position sensor is a Temposonics® magnetostrictive position sensor, commercially available from MTS Sensors of Cary, North Carolina.

In an exemplary embodiment, an electronic controller 96 is incorporated into the design of cart 10 such that the lift cylinders 68 and the tilt cylinders 70 have positions both monitored and set by the controller 96. Any other sensors 100, 102, 104, 106 and 108 (discussed below), for example, in cart control system 98 can also provide signal input to the controller 96. The controller 96 can be any computer processor enabled device that is able to receive input signals from sensors and weigh bars WL, WR, WH and to deliver output control signals to the lift cylinders 68, tilt cylinders 70, and also, if desired, positional control of components of top wall assembles 24, 24' for automating their folding and hinging positional changes. In the case of a self-driven cart 10, the controller 96 can also control the motion of tracks 16.

A wide variety of suitable sensors can be used in control system 98. A few exemplary sensors for feeding signal information to controller 96 include, for example, accelerometer 100 to measure overall cart acceleration and cart angle relative to the ground, as well as bin angle at any degree of lift and/or tilt. Speed sensor 102 can be used to detect ground speed of cart 10 while traversing the ground surface, such as by being towed by a tractor 114. Global Positioning System (GPS) 104 can be used to send signals to controller 96 regarding the position of cart 10 on earth. Pressure sensor 106 can send signals to controller 96 regarding hydraulic cylinder pressure of each of the lift cylinders 68 and tilt cylinders 70. Proximity sensor 108 in an exemplary embodiment determines a distance between the cart 10 and a truck trailer that is near the cart and in position to receive material therefrom; such a proximity sensor 108 can also determine fill characteristics inside each of the bins 14 and relay those signals to the controller 96.

As shown in FIGS. 1B and 1C, each of left weigh bar WL, right weigh bar WR, and hitch weigh bar WH determines a weight of the cart 10 acting upon the weigh bars. In an exemplary embodiment, a suitable weigh bar for each of WL and WR is available commercially from Avery Weigh-Tronix, a subsidiary of Illinois Tool Works, headquartered in the United Kingdom. A suitable weigh bar is marketed as a 5.5-inch weigh bar with part number AWT27-500193. For hitch weigh bar WH, a suitable component is commercially available from Avery Weigh-Tronix as a 3.73-inch weigh bar, part number AWT27-500126. Each of the weigh bars WL, WR and WH determines a weight of the cart 10 at its respective location and relays a signal regarding the sensed weight to the controller 96.

The weight of the cart 10 is calculated by determining the weight at the left axle via WL, right axle via WR and at the hitch via WH. A maximum weight is predetermined by the cart control system 98 based on the product density and the truck volume in which capacity, which can be automatically or manually input into the system 98. With inputs from WL, WR, WH, 92, 94, 100, 102, 104, 106, 108 and any other sensors, controller 96 controls actuation signals of hydraulic system 110. Hydraulic fluid flow to the lift cylinders 68 and tilt cylinders 70 through hydraulic lines 78 can be supplied by either an on-board or tractor-based hydraulic system 110.

A process for filling cart 10 includes, in an exemplary embodiment, pulling cart 10 by attachment to a propelled tractor 114. Cart 10 is typically moved alongside a harvester or other agricultural implement that supplies fill material to cart 10. Conventional cart unloading and container filling operations are described in the following references, which are hereby incorporated by reference: U.S. Pat. No. 10,028,441 to Van Mill; U.S. Pat. No. 9,529,364 to Foster; International Patent Application WO 2018/226139 to Cirillo; European Patent EP 3 095 315 to Jeninga; U.S. Pat. No. 10,575,453 to Blackwell; and U.S. Pat. No. 9,188,986 to Baumann.

There may be variations in the use of cart control system 98 in unloading cart operations. For example, for optimal stability of cart 10 on a ground surface, front bin 14*a* and rear bin 14*b* can be unloaded independently of each other. For example, once the maximum predetermined weight of cart 10 has been reached, filling of the cart by the harvesting machine (not shown) is complete. The cart 10 is moved to the end of the field to begin an unloading process proximate a receiving trailer or similar container. To decrease the amount of time needed for unloading cart 10, some preliminary steps can be taken while cart 10 is still traversing the field. For example, as cart 10 nears the receiving container, while the cart is traversing the field, lift cylinders 68 can be actuated on one or both bins 14, as shown in FIGS. 4A and 4B to lift the bins 14 off and above the base frame 32. Upon arrival of the cart 10 next to the receiving container, and most commonly when the cart 10 in no longer in motion, a position of the cart next to the receiving container is determined by an operator of the towing tractor 114 or by automatic means. To accomplish automatic positioning of the cart next to the receiving container, sensors such as camera-based mapping systems or similar can be used to determine an optimal location of the cart 10 relative to a receiving container.

The tilt cylinder 70 of one of the bins 14 can be actuated to tilt the respective bin and empty product from that bin 14 through gravity primarily. However, it is contemplated that the construction of bin 14 can incorporate features such as a live wall into slanted side wall 40 to facilitate emptying of the bin. Suitable live wall mechanisms are disclosed in the following U.S. Patents, which are hereby incorporated by reference: U.S. Pat. No. 10,682,940 to Karg; U.S. Pat. No. 5,826,947 to Hornung; U.S. Pat. No. 4,662,160 to Hubbard; and U.S. Pat. No. 4,494,904 to Hill.

During a bin emptying process, the weight of the machine at each of weigh bars WL, WR, and WH is monitored. If WL drops below a minimum predetermined or calculated safety threshold, tilt function via actuation of tilt cylinder 70 is stopped, moderated and/or reversed. Lift cylinders 68 can also be retracted. The right weigh bar reading at WR is monitored to ensure that a maximum loaded safety threshold is not breached. The rate of extension of tilt cylinder 70 is determined by calculating weight reading changes in WL versus WR. A predetermined threshold weight rate of change (WRC) from the WL to the WR controls the product unloading speed and is predetermined based on product types being transferred, as well as capabilities of the receiving container to be loaded at a given maximum rate. Sensors can also be incorporated into the receiving container to communicate with the cart controller 96 in order to ensure that product does not overfill the receiving container. Generally, it is desirable to empty cart 10 as quickly as possible while preventing its overturn and product damage or spillage.

A method for transferring product using cart 10 includes inputting to a computer controller a first threshold rate of change in weight signals of a weight sensor; relaying a plurality of weight signals from the weight sensor to the controller; calculating a determination by the controller at least in part on whether the threshold rate of change has been exceeded; and automating actuation of a hydraulic assembly based on the determination. If the determination is that the threshold rate of change has not been exceeded, then lift cylinders 68 and tilt cylinders 70 can be extended at rates up to those pre-determined or manually input as suitable for the applicable fill material and other conditions. If, however, the determination is that the threshold rate of change has been met or exceeded, then lift cylinders 68 and/or tilt cylinders 70 will be automatically stopped, moderated and/or retracted to address potentially adverse effects of product damage, spillage, uneven container filling, or cart tipping, for example.

In one exemplary embodiment of an unloading scenario, once the first raised bin has been tilted and emptied, both the tilt cylinders 70 and the lift cylinders 68 for that bin 14 are retracted to lower and straighten the bin and return it to the base frame 32 for optimal cart stability. Then the tilt cylinders 70 are actuated for the remaining full bin 14, which is emptied with similar monitoring to that described above for the first emptied bin. After both bins have been emptied and all cylinders retracted, cart 10 returns to the field to receive additional fill material from a source, such as an agricultural harvester.

In a second unloading scenario, which may be completed even more quickly than the first unloading method described above, both bins 14 of a cart 10 may be unloaded simultaneously. Such simultaneous dual unloading may be permissible without cart overturning due to field conditions, fill product properties, or other attributes. In this case, many steps are similar to the process described above including, for example, filling the cart, moving it to a receiving container, pre-raising the bins while in motion, and locating the cart relative to the receiving container.

The tilt cylinders 70 of both bins 14 can be actuated to tilt the bins and empty product through gravity primarily. During a bin emptying process, the weight of the machine at each of weigh bars WL, WR, and WH is monitored. If WL drops below a minimum predetermined or calculated safety threshold, tilt function via actuation of tilt cylinder 70 is stopped, moderated and/or reversed. Lift cylinders 68 can also be retracted. The right weigh bar reading at WR is monitored to ensure that a maximum loaded safety threshold is not breached. The rate of extension of tilt cylinder 70 is determined by calculating weight reading changes in WL versus WR. A predetermined threshold weight rate of change (WRC) from the WL to the WR controls the product unloading speed and is predetermined based on product types being transferred, as well as capabilities of the receiving container to be loaded at a given maximum rate. Sensors can also be incorporated into the receiving container to communicate with the cart controller 96 in order to ensure that product does not overfill the receiving container. Generally, it is desirable to empty cart 10 as quickly as possible while preventing its overturn and product damage or spillage.

Once both bins have been tilted and emptied, both the tilt cylinders 70 and the lift cylinders 68 for the bin 14 are retracted to lower and straighten the bins and return them to the base frame 32 for optimal cart stability. Then cart 10 returns to the field to receive additional fill material from a source, such as an agricultural harvester.

Controller 96 is programmed to use predetermined weight and threshold information, with signal input from the various sensors WL, WR, WH, 92, 94, 100, 102, 104, 106, 108 and any other sensors, to automatically raise the bins and empty them in as quick a manner as possible while controlling to prevent cart tipping, ensure even trailer filling, and control dump speed and height to prevent product damage and spillage, for example. The controller considers weight at WL and WR, as well as rates of weight change at WL and WR, to correct when differences between left and right may cause tipping. The controller sends commands to lift and lower the bins, as well as change the angle of each bin's inclination. Positional sensors to locate the semi-trailer can also be used to automate movement of the cart relative to the semi-trailer in order to evenly load the semi-trailer. In some embodiments of unloading cart 10, because at least the extension and retraction of lift cylinders 68 and tilt cylinders 70 is automated by controller 96, the unloading operation is optimized for speed, efficiency and product quality despite lack of dumping experience by a driver of tractor 114. In some embodiments, controller 96 uses preprogrammed logic and thresholds, as well as manual input regarding the fill material, and takes into account contemporaneous inputs from weigh bar and sensor input signals.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa. All references mentioned in this disclosure are hereby incorporated by reference.

The invention claimed is:

1. A method for transferring product using an apparatus, the apparatus comprising:
- a base frame having opposite first and second sides;
- a first bin;
- a first lifting assembly;
- a second bin; and
- a second lifting assembly;

the method comprising:
- obtaining a first side weight signal from a first sensor;
- obtaining a second side weight signal from a second sensor;
- raising the first bin from the base frame, tilting the first bin toward the first side, and lowering the first bin onto the base frame; and
- raising the second bin from the base frame independently from raising the first bin from the base frame, tilting the second bin toward the first side, and lowering the second bin onto the base frame.

2. The method of claim 1 wherein tilting the first bin toward the first side comprises extending a first cylinder of the first lifting assembly.

3. The method of claim 2 comprising:
- lowering the first bin from a first height; and
- raising the second bin to the first height.

4. The method of claim 3 wherein tilting the second bin toward the first side comprises extending a second cylinder of the second lifting assembly.

5. The method of claim 1 comprising actuating the first lifting assembly based on at least one of the first side weight signal and the second side weight signal.

6. The method of claim 1, wherein the apparatus comprises a top back wall disposed at a top edge of at least one of the first and second bins, the method comprising changing a position of the top back wall with respect to the respective bin.

7. The method of claim 1 wherein raising the first bin occurs while the apparatus traverses a ground surface.

8. The method of claim 1 comprising simultaneously raising the first bin and the second bin from the base frame.

* * * * *